United States Patent [19]
Kleinberg et al.

[11] Patent Number: 5,204,568
[45] Date of Patent: Apr. 20, 1993

[54] SUPERCONDUCTING BEARING FOR BOREHOLE AND SURVEY GRAVIMETERS

[75] Inventors: Robert L. Kleinberg, Ridgefield; Douglas D. Griffin, Bethel, both of Conn.; Richard J. Warburton, Del Mar, Calif.

[73] Assignee: GWR Instruments, San Diego, Calif.

[21] Appl. No.: 763,988

[22] Filed: Sep. 23, 1991

[51] Int. Cl.$^5$ .................. H02K 7/09; G01V 3/08; G01C 9/06; G01M 1/12
[52] U.S. Cl. ........................ 310/90.5; 33/366; 73/382 R; 324/346
[58] Field of Search ............ 73/382, 516 R; 310/90.5; 324/207.22, 226, 346; 33/366

[56] References Cited

U.S. PATENT DOCUMENTS

| | | |
|---|---|---|
| 2,293,437 | 8/1942 | La Coste et al. |
| 2,377,889 | 6/1945 | La Coste et al. |
| 3,424,006 | 1/1969 | Dicke et al. ............ 73/382 |
| 3,449,956 | 6/1969 | Goodkind et al. ....... 73/382 |
| 3,474,672 | 10/1969 | La Coste et al. |
| 3,491,600 | 1/1970 | Kasparian, Jr. |
| 3,554,034 | 8/1968 | La Force ............... 73/382 |
| 3,680,392 | 8/1972 | Hoffman et al. |
| 3,691,850 | 9/1972 | Slater et al. |
| 3,742,767 | 7/1973 | Bernard et al. |
| 3,965,753 | 6/1976 | Browning, Jr. |
| 4,344,235 | 8/1982 | Flanders. |
| 4,349,781 | 9/1982 | Vozoff ................. 324/346 |
| 4,445,371 | 5/1984 | Lautzenhiser. |
| 4,620,752 | 11/1986 | Fremerey et al. ...... 310/90.5 |
| 4,956,571 | 9/1990 | Gordon et al. ........ 310/90.5 |

OTHER PUBLICATIONS

A. Sezginer and W. C. Chew, Image of a Static Current Loop Over a Superconducting Sphere, unpublished report (Aug. 1989).
A. Sezginer, Field of a Magnet in a Cylindrical Shield, unpublished notes (Dec. 1989).
*Accuracy and Reliability in Land, Underwater, Air/Sea, Borehole and Earth-Tide Gravity Meters*, brochure from LaCoste & Romberg Gravity Meters, Inc., Austin, Texas (4 pages, undated).

W. A. Prothero, A Cryogenic Gravimeter, Ph.D. dissertation, University of California, San Diego (1967).
W. A. Prothero et al., *A Superconducting Gravimeter*, Review of Scientific Instruments, vol. 39, No. 9, pp. 1257-1262 (1968).
GWR Superconducting Gravity Meter, brochure of GWR Instruments, San Diego, California (4 pages, Nov. 1985).
C. W. F. Everitt et al., Final Report on Contract NAS-8-32605 to Perform Laboratory Research on Superconducting Bearings for Application in Cryogenic Experiments in Space, Stanford University (1980).
P. W. Worden, Jr., *Measurement and Control of Disturbing Forces on an Equivalence Principle Experiment*, Hansen Laboratories, Stanford University, California (preprint, 5 pages, undated).
P. W. Worden, Jr., *Measurement of Small Forces with Superconducting Magnetic Bearings*, Precision Engineering, vol. 4, No. 3, pp. 139-144 (1982).
T. A. Buchhold, *The Magnetic Forces on Superconductors and Their Applications for Magnetic Bearings*, Cryogenics, vol. 2, pp. 203-211 (Jun. 1961).
K. W. Rigby, *Design of Magnets Inside Cylindrical Superconducting Shields*, Review of Scientific Instruments, vol. 59, No. 1, pp. 156-158 (1988).
R. B. Lindsay, Physical Mechanics, D. Van Nostrand Company, Inc. (1961), pp. 359-360.

Primary Examiner—Steven L. Stephan
Assistant Examiner—C. LaBalle
Attorney, Agent, or Firm—Bruce D. Riter

[57] ABSTRACT

Superconducting bearings inhibit the excitation of modes in a superconducting force measuring instrument such as a superconducting gravimeter, and effecively damp such modes in the event they are excited. Excitation of modes is inhibited by magnetically and/or physically blocking orbital and rotational motions. Modes which are excited are efficiently damped, preferably by inducing eddy currents in lossy metal parts. These dissipative eddy currents remove energy from the motion, causing the motion to decay exponentially with time. A significant advantage of the bearing design is that the magnetic field of the bearing can be isolated from the main levitation system. This ensures that the bearing interferes minimally with the gravity measurement.

36 Claims, 25 Drawing Sheets

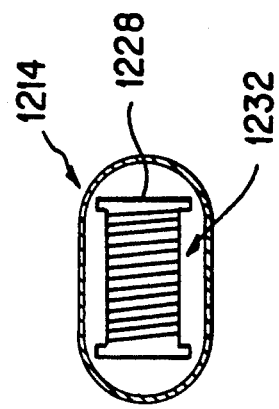
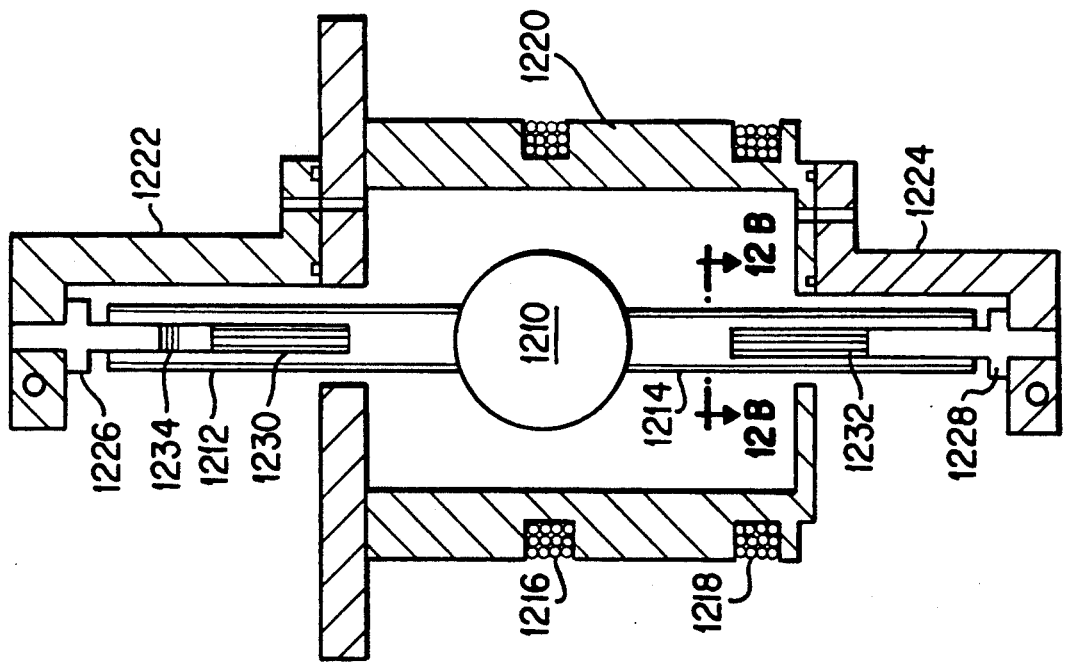

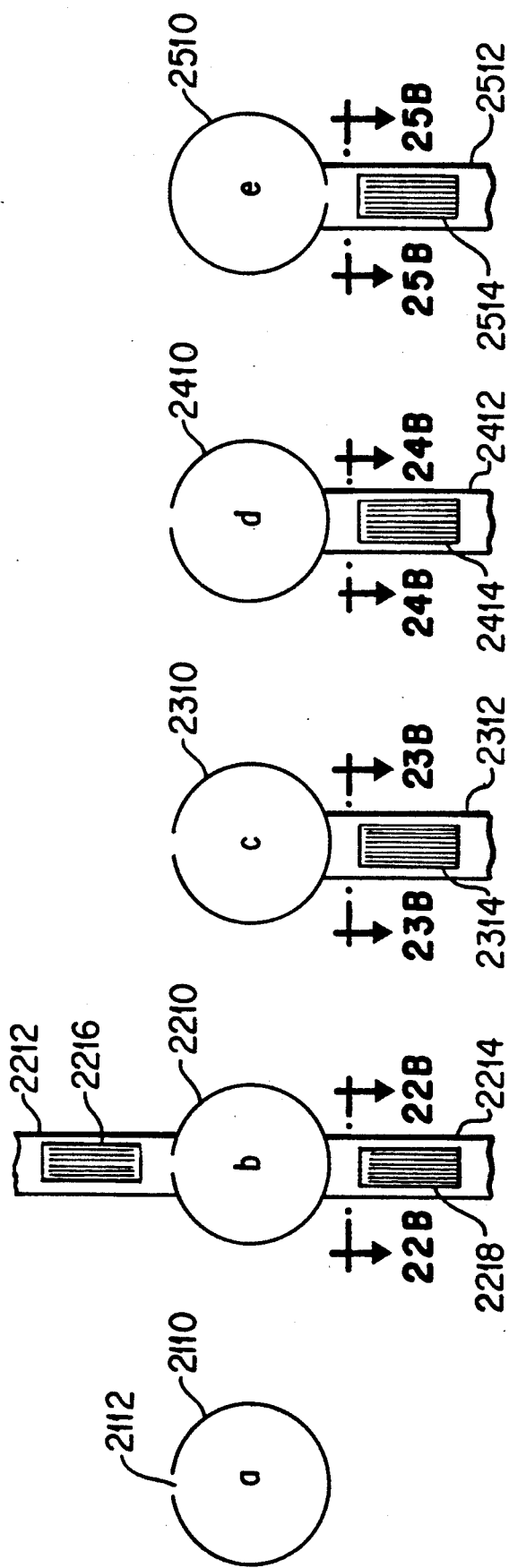

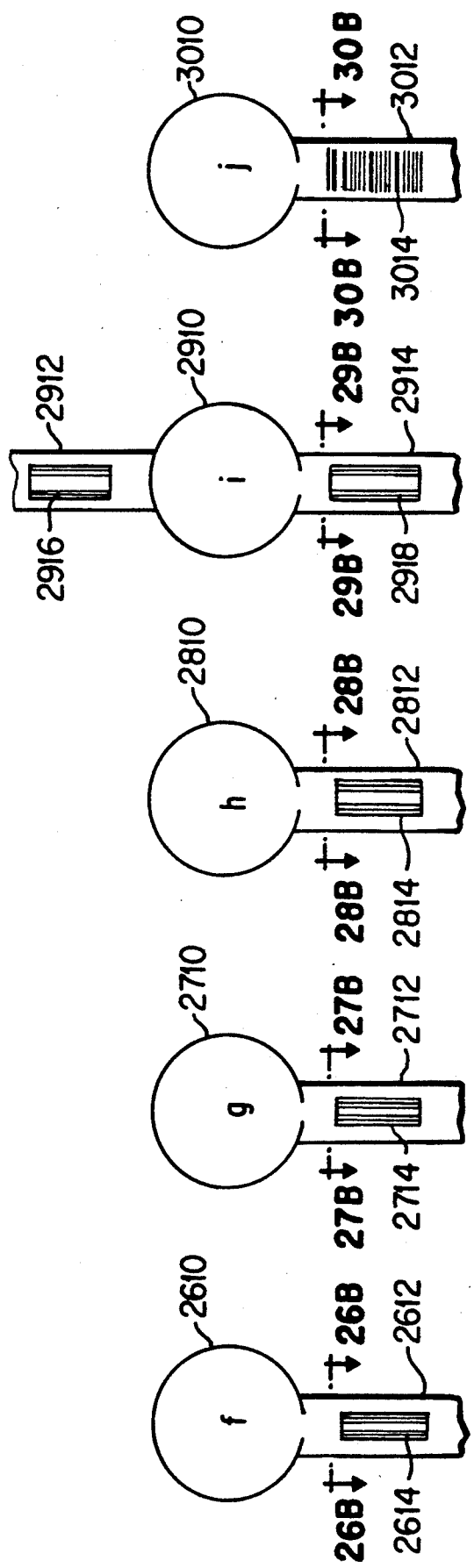

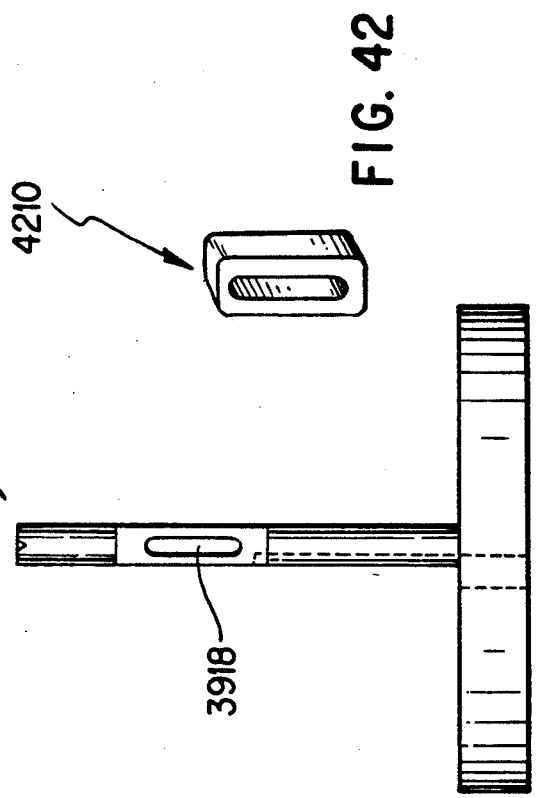
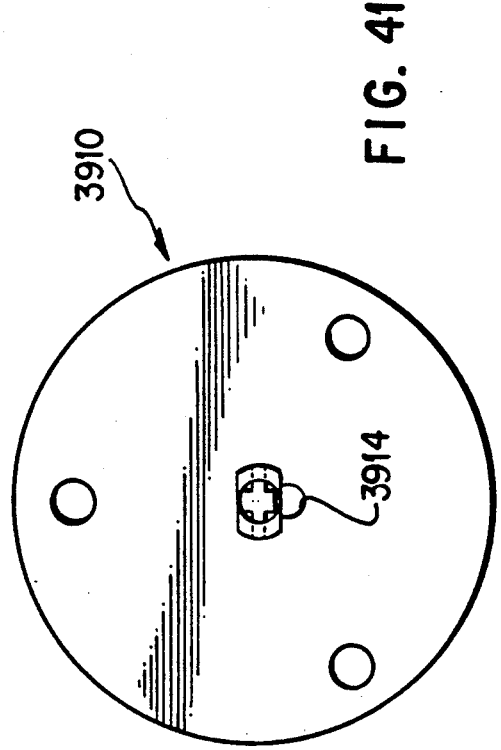
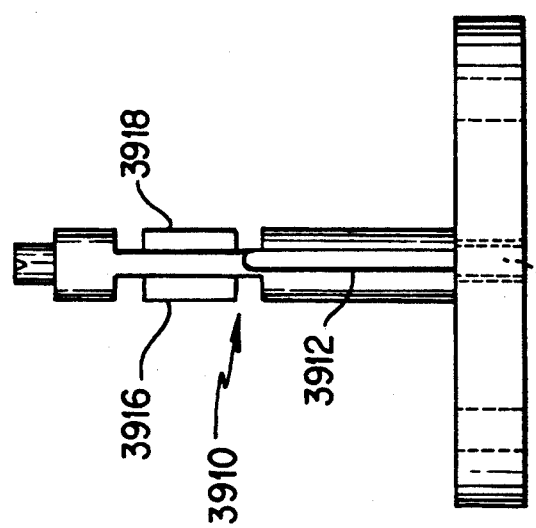

SUPERCONDUCTING BEARING FOR BOREHOLE AND SURVEY GRAVIMETERS

BACKGROUND OF THE INVENTION

1. Field of the Invention

The present invention relates to superconducting bearings, and more particularly to superconducting bearings for force-measuring instruments such as gravimeters useful in borehole and surface surveys.

2. The Prior Art

Gravimeters have long been used for land, sea, and air surveys of the earth's gravitational field. These surveys have been conducted for geophysical research purposes, and to locate mineral or hydrocarbon deposits beneath the surface of the earth.

Borehole gravity measurements are used commercially for reservoir delineation. The difference between the measured magnitude of gravitational force at two stations in a borehole, divided by the station spacing, is directly proportional to the density of a disc whose upper and lower surfaces are defined by the station locations. The radius of the disc is roughly five times the station spacing; 90% of the signal originates from within this radius. Station spacings of one to ten meters are common, although any spacing can be used. The measurement is thus significantly deeper than that of other borehole measurement instruments, but has the disadvantage that the gravimeter cannot be moved during a measurement. A precision of 0.01 g/cc in the density determination is required to satisfy the demands of the oil exploration industry. This requires that the force of gravity be measured to better than one part per billion.

BOREHOLE AND SURVEY GRAVIMETERS

All gravimeters are essentially composed of a mass supported by a spring. Borehole and survey gravimeters have many difficult and conflicting mechanical requirements. For example, the mass and suspension must be stable over time to within one part per billion, yet be able to withstand shocks a billion times larger than the meter's sensitivity when being moved before or between measurements.

A number of groups have built gravimeters that satisfy most, though not all, the requirements. LaCoste and Romberg have commercialized borehole and portable gravimeters. See e.g., U.S. Pat. Nos. 2,293,437 and 2,377,889. The LaCoste and Romberg meter has reasonable environmental specifications, but has problems of drift. It is also not sensitive enough to make precision measurements at vertical spacings of less than 10 meters.

The most stable, lowest noise gravimeter known is the superconducting gravimeter. This gravimeter owes its superior performance characteristics to its suspension system, which consists of a superconducting sphere levitated by a magnetic field generated by superconducting coils. See, e.g., W.A. PROTHERO, A CRYOGENIC GRAVIMETER, Ph,D. dissertation, University of California, San Diego (1967); W. A. PROTHERO, J. M. GOODKIND, *A Superconducting Gravimeter,*, REVIEW OF SCIENTIFIC INSTRUMENTS, Vol. 39, No. 9, pp. 1257-1262 (1968); and U.S. Pat. No. 3,449,956 to J.M. Goodkind and W.A. Prothero (1969), all of which are incorporated herein by reference.

FIG. 1 is a simplified cross-sectional view of a superconducting gravimeter sensing unit of the Goodkind-Prothero type as commercialized by GWR Instruments of San Diego, California. GWR gravimeters have until now been used almost exclusively at fixed sites; one such gravimeter located in a mine is moved on a rail.

Referring to FIG. 1, the basic elements of the GWR gravimeter are a one-inch diameter superconducting sphere 110 which is levitated by a pair of superconducting main coils 112. The currents in coils 112 are adjusted to provide a vertical force sufficient to support the weight of sphere 110, but with a vertical force gradient weak enough to allow a sensitive measurement of changes of the force of gravity. The position of sphere 110 is detected by comparing the capacitance between an upper polar plate 114 and a equatorial plate 118 with the capacitance between a lower polar plate 116 and equatorial plate 118 in a bridge network. An ac voltage is applied across the upper and lower plates via plate leads 120. The voltage sensed at lead 122 of equatorial plate 118 is proportional to the displacement of the sphere from the vertical midpoint between polar plates 114 and 116, the phase of the voltage indicating whether sphere 110 is above or below the midpoint. In normal operation, sphere 110 is maintained at the midpoint between polar plates 114 and 116 by a feedback system which applies current to a feedback coil 124 to produce a magnetic field force which counteracts any vertical displacement of sphere 110 such as that resulting from a change in the force of gravity. Sphere 110 may alternatively be maintained at the midpoint by a feedback system which produces an electrostatic field force. Capacitor plates 114, 116 and 118 are mounted in a coil form 126 by means of insulative material 128, such as epoxy. The interior of coil form 126 is filled with Helium gas at gas fill port 130, and sealed. The entire system is surrounded by superconducting shielding and is temperature regulated by means of a germanium thermometer 132 and heater 134 (connections not shown) to a few $\mu°K$ inside a vacuum can. Coil form 126 is mounted on vacuum can lid 136 by insulating support rods 138, and enclosed by a superconducting shield 140, a vacuum can 142, and a mu-metal shield 144. Shield 144 is fastened to a fiberglass neck member 146 by screws 148. The interior of vacuum can 142 communicates with a pump (not shown) via a pump line 150. The system is maintained at 4.2°K by suspension inside a liquid helium Dewar flask.

The gravimeter-Dewar system is supported with two high-precision micrometer heads which allow tilting of the system with respect to a fixed point. X-axis cryogenic tilt meter 152 and Y-axis cryogenic tilt meter 154 are mounted within vacuum can 142 on can lid 136. Each has a pendulum bob 156 suspended from a clamp 158 by a support foil 160 between capacitive sensing plates 162. Each tilt meter is enclosed in a can 164 filled with Helium gas and provided with electrical feedthroughs 166 for supplying signals to an automatic tilt compensation system (not shown).

Long-Lived Mechanical Resonances

The GWR gravimeter employs an utterly frictionless support system. Damping in the system is due to (1) the viscous interaction between sphere 110 and the low-pressure helium gas which surrounds it, and (2) eddy currents generated in capacitor plates 114, 116 and 118, and in coil form 126, which result from field changes associated with sphere motion. Vertical oscillatory modes are effectively damped by the eddy current mechanism, but other modes are not. Therefore, once a rotational or vibrational mode is excited, it takes a long time to decay, typically on the order of an hour.

FIG. 2 shows a sample gravity record made with a GWR gravimeter, showing exemplary mode effects. Reading from the left, the chart recorder was first run at 2 minutes/division after a shock was applied to the gravimeter (chart section 210), to allow observation of mode frequency. Chart speed was then reduced (at 215) to 15 minutes/division to record decay. During the decay, the gravity signal is superimposed on a sinusoid of large amplitude, making a precision measurement difficult or impossible—significant changes in gravity are less than the thickness of the pen line on the vertical scale. A meaningful gravity measurement begins only after about 4 hours of settling time. In order to be economically useful in a well-logging environment, the instrument is preferably ready to make a measurement within a minute or so of being placed at a station. Means for eliminating or quickly damping these resonances must therefore be provided before borehole or survey deployment can be considered.

A magnetically-supported sphere can support a myriad of long lived modes. See e.g., W.A. PROTHERO, A CRYOGENIC GRAVIMETER, Ph.D. dissertation, University of California, San Diego (1967). These modes can be grouped into three categories: rotational, orbital, and vibrational. Even modes with no apparent vertical component can couple signals that mimic vertical motions into the position-sensing capacitor. Such signals are believed to result from various types of sphere imperfections, such as asphericity and asymmetric mass distributions; for example, spheres used in GWR gravimeters are hollow and have a hole drilled into them. Rotational and orbital modes are characterized by trajectories of constant potential energy; it is believed that such modes could be eliminated by breaking all symmetries in the levitation system. Vibrational modes, in which the sphere oscillates in potential energy wells, result from symmetry breaking and must be damped.

The mechanical response of the GWR gravimeter has been well-characterized. Vertical oscillations are overdamped with a fundamental period of, typically, 3 seconds. Radial oscillations in the horizontal plane have a fundamental period of approximately 0.4 seconds. This suggests that the mode of the GWR gravimeter is neither a vertical oscillation nor a horizontal orbit. The constancy of the observed period appears to rule out rotational motion. J. Goodkind has hypothesized that the mode is a result of slight symmetry breaking, resulting in an azimuthal oscillation of decaying amplitude and time-independent but of arbitrarily low frequency.

Superconducting Bearings

Superconducting bearings have been developed to levitate horizontal gyroscopes. See, e.g., C.W.F. EVERITT and P.W. WORDEN, JR., FINAL REPORT ON CONTRACT NAS8-32605 TO PERFORM LABORATORY RESEARCH ON SUPERCONDUCTING BEARINGS FOR APPLICATION IN CRYOGENIC EXPERIMENTS IN SPACE, Stanford University (1980); P.W. WORDEN, JR., *Measurement and Control of Disturbing Forces on an Equivalence Principle Experiment*, preprint; P.W. WORDEN, JR., *Measurement of Small Forces with Superconducting Magnetic Bearings*, PRECISION ENGINEERING, Vol. 4, No. 3, pp. 139-144 (1982).See also T.A. BUCHHOLD, *The Magnetic Forces on Superconductors and Their Applications for Magnetic Bearings*, CRYOGENICS, Vol. 2, pp. 203-211 (Jun. 1961). Superconducting bearings depend on the principle that superconductors are perfectly diamagnetic. That is, superconductors will tend to be repelled from any source of magnetic field. If current is caused to flow through a coil or other system of windings, forces are developed which can be used to levitate a superconducting structure.

Although the superconducting bearings described in the literature have many useful properties, they are themselves susceptible to long-lived mechanical resonances. Such bearings are thus not believed useful for suppressing the modes of the gravimeter.

SUMMARY OF THE INVENTION

It is an object of the present invention to overcome many of the disadvantages of the prior art gravimeters. It is further an object of the present invention to provide a superconducting bearing suitable for use in force-measuring instruments such as gravimeters. It is still further an object of the present invention to provide a force-measuring instrument having improved settling time following application of a shock. These and other objects are attained in accordance with the present invention.

The present invention provides for superconducting bearings which inhibit the excitation of modes in a superconducting force measuring instrument such as a superconducting gravimeter, and which effectively damp such modes in the event they are excited. Excitation of modes is inhibited by magnetically and/or physically blocking orbital and rotational motions. Modes which are excited are efficiently damped, preferably by inducing eddy currents in lossy metal parts. These dissipative eddy currents remove energy from the motion, causing the motion to decay exponentially with time. A significant advantage of the bearing design is that the magnetic field of the bearing can be isolated from the main levitation system. This ensures that the bearing interferes minimally with the gravity measurement.

BRIEF DESCRIPTION OF THE DRAWING

Preferred embodiments of the invention are described in more detail below with reference to the accompanying drawing, in which:

FIG. 12A is a partial sec— .i view of a superconducting gravimeter construct⋯ in accordance with the invention to include upper and lower bearings having bearing coils and sleeves of the kind shown in FIGS. 10 and 11A-11C;

FIG. 12B is an enlarged sectional detail view taken along line 12B—12B of FIG. 12A;

FIG. 21 is a schematic view of a prior-art gravimeter sphere without bearings, used as an experimental baseline case (a) for comparison with subsequent trials;

FIG. 22A is a schematic sectional view of a configuration (b) in accordance with the invention having bearings of non-circular cross-section above and below the gravimeter sphere;

FIG. 22B is a sectional view taken along line 22B—22B of FIG. 22A;

FIG. 23A is a schematic sectional view of a configuration (c) in accordance with the invention having a single bearing of non-circular cross-section below the gravimeter sphere;

FIG. 23B is a sectional view taken along line 23B—23B of FIG. 23A;

FIG. 24A is a schematic sectional view of a configuration (d) in accordance with the invention having a single bearing with a sleeve of broken, circular cross-section below the gravimeter sphere;

FIG. 24B is a sectional view taken along line 24B—24B of FIG. 24A;

FIG. 25A is a schematic sectional view of a configuration (e) in accordance with the invention having a single bearing with a sleeve of continuous circular cross-section below the gravimeter sphere;

FIG. 25B is a sectional view taken along line 25B—25B of FIG. 25A;

FIG. 26A is a schematic sectional view of a configuration (f) in accordance with the invention having a single bearing with a sleeve of non-circular cross-section below the gravimeter sphere and a coil assembly which produces a relatively cylindrically symmetric field;

FIG. 26B is a sectional view taken along line 26B—26B of FIG. 26A;

FIG. 27A is a schematic sectional view of a configuration (g) in accordance with the invention which is the same as configuration (f), except that the coil bobbin is of annealed copper;

FIG. 27B is a sectional view taken along line 27B—27B of FIG. 27A;

FIG. 28A is a schematic sectional view of a configuration (h) in accordance with the invention, in which a larger and less symmetric bearing coil assembly is employed;

FIG. 28B is a sectional view taken along line 28B—28B of FIG. 28A;

FIG. 29A is a schematic sectional view of a configuration (i) in accordance with the invention which has upper and lower bearings of the same construction as the lower bearing of configuration (h);

FIG. 29B is a sectional view taken along line 29B—29B of FIG. 29A;

FIG. 30A is a schematic sectional view of a configuration (j) in accordance with the invention which has a single lower bearing with a horizontally-disposed coil winding;

FIG. 30B is a sectional view taken along line 30B—30B of FIG. 30A;

FIG. 39 is a front elevation view, FIG. 40 is a side elevation view, and FIG. 41 is a top view, of still another bearing coil form in accordance with the invention; and FIG. 42 shows a coiled bundle of niobium wire to be mounted on the bearing coil form of FIGS. 39–41.

DETAILED DESCRIPTION OF THE INVENTION

Figure 3:
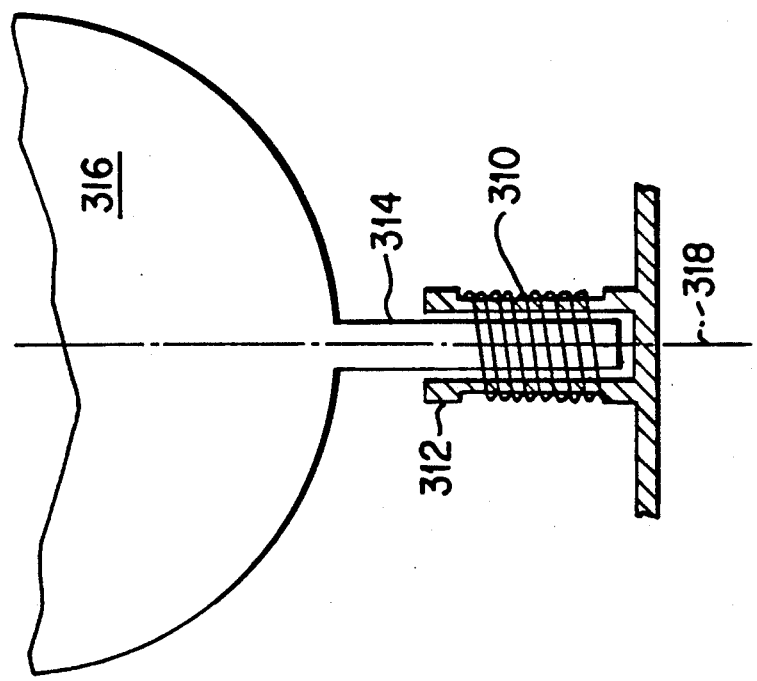
FIG. 3 is a schematic view of an external bearing in accordance with the invention.

Superconducting bearing designs in accordance with the invention can be divided into two broad classes, external and internal. FIG. 3 shows a schematic view of an external bearing. A coil of wire 310 wound on a coil form 312 surrounds a superconducting rod 314 affixed to the bottom of superconducting sphere 316. When current is applied to coil 310, the superconducting rod 314, if assumed to be perfectly diamagnetic (i.e. SI magnetic susceptibility equals $-1$), moves to the region of lowest magnetic field strength. For a short coil 310, this is on the coil's axis 318. That is, the magnetic field tends to move the longitudinal axis of rod 314 into coincidence with bearing coil axis 318. Coil form 312 is preferably made of a lossy conductive material, such as high-purity copper, so that changes in the bearing's magnetic field resulting from such movement will induce eddy currents in coil form 312. Ohmic losses in coil form 312 dissipate the kinetic energy of such movement.

Figure 4:
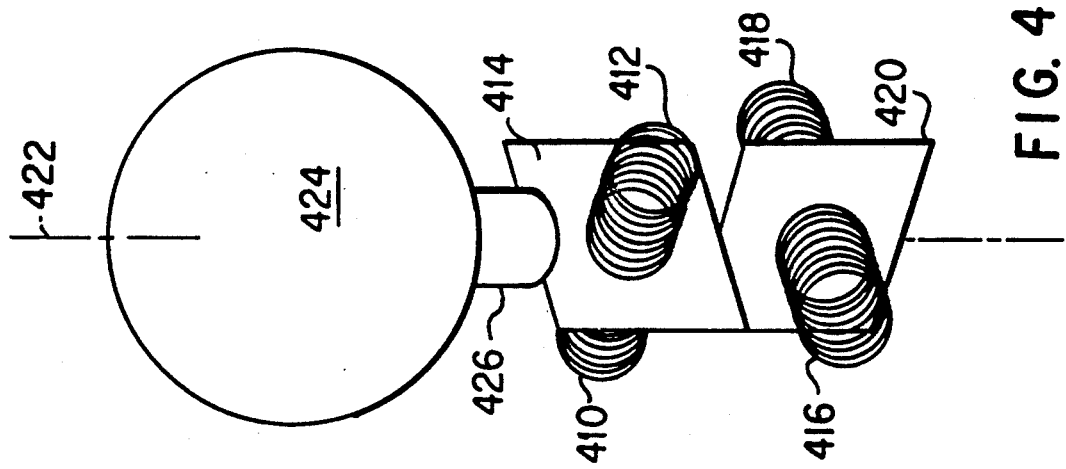
FIG. 4 is a schematic view of an alternate external bearing in accordance with the invention.

Another external bearing arrangement is shown schematically in FIG. 4. Here the magnetic field from coils 410 and 412 apply a centering force to a plate 414 and the magnetic field from coils 416 and 418 apply a centering force to a plate 420. Plates 414 and 420 lie in orthogonal planes on the vertical axis 422 of superconducting sphere 424 by cylindrical member 426. Members (not shown) of lossy conductive material are located within the magnetic field from coils 410–418 to dissipate energy of modes other than vertical oscillatory modes.

Figure 5:
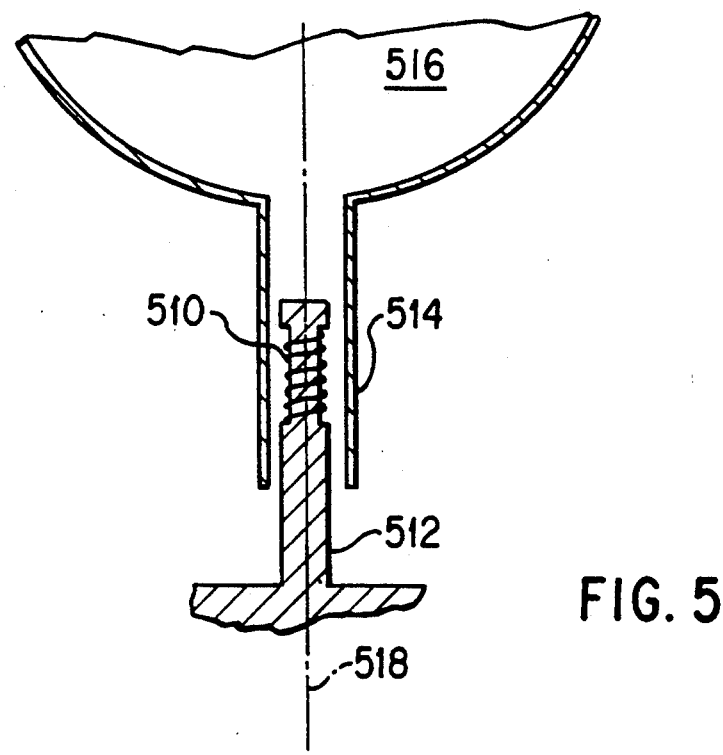
FIG. 5 is a schematic view of an internal bearing in accordance with the invention.

An internal bearing structure is shown schematically in FIG. 5. Here, a coil 510 wound on a coil form 512 is situated within a hollow, superconducting sleeve 514 affixed to superconducting sphere 516. The magnetic field caused by current flowing in bearing coil 510 tends to centralize sleeve 514 on vertical bearing axis 518. Coil form 512 is preferably made of a lossy, conductive material in which dissipative eddy currents are induced by changes in the magnetic field of the bearing.

Figure 6:
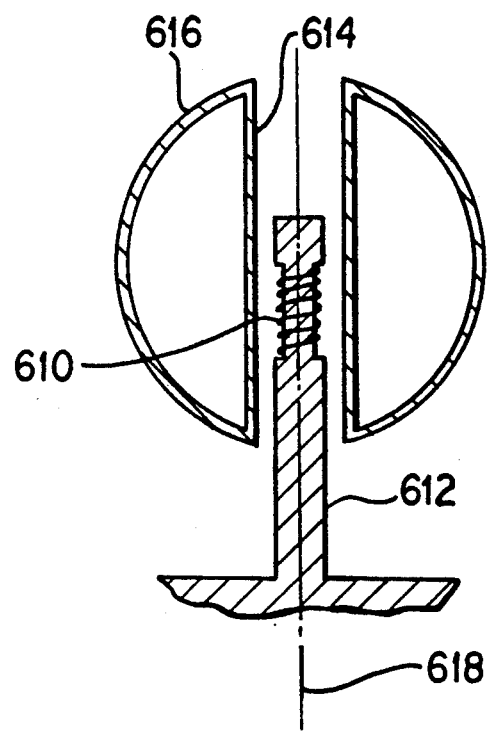
FIG. 6 is a schematic view of an alternate internal bearing in accordance with the invention.

An alternate internal bearing structure is shown schematically in FIG. 6. A coil 610 supported on a coil form 612 lies within a hollow, superconducting sleeve 614 provided within superconducting sphere 616. Current flowing in coil 610 causes sleeve 614 to be centralized on vertical axis 618. Coil form 612 is preferably made of a lossy, conductive material for dissipating energy.

Figure 1:
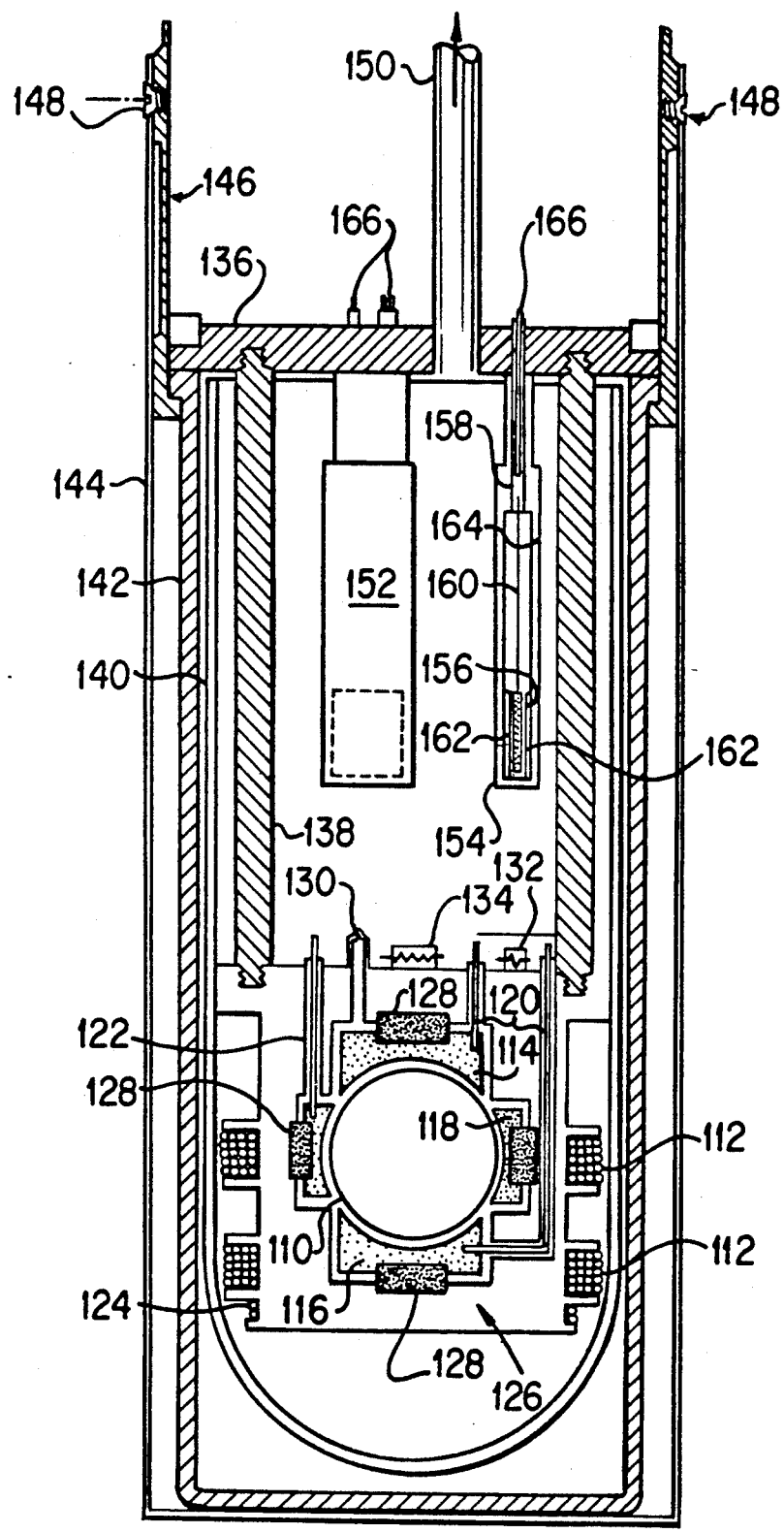
FIG. 1 is a simplified cross-sectional view of a prior-art superconducting gravimeter sensing unit.

While an external bearing structure may be easier to construct, it is preferable to use an internal bearing design in a gravimeter of the type shown in FIG. 1. Fields generated inside a cylinder cannot penetrate the superconducting wall of the cylinder, and are exponentially attenuated along the longitudinal axis. See, e.g., K. W. RIGBY, *Design of Magnets Inside Cylindrical Superconducting Shields*, REVIEW OF SCIENTIFIC INSTRUMENTS, Vol. 59, No. 1, pp. 156–158 (1988); and A. SEZGINER, FIELD OF A MAGNET IN A CYLINDRICAL SHIELD, unpublished notes (December 1989). Thus for a bearing sleeve of even moderate length, there is no interaction between the bearing's magnetic field and the main levitation field.

It should be noted that any real bearing will apply some vertical force to the levitated body. This occurs if the superconducting rod (e.g., in an external bearing of the type shown in FIG. 3) or the superconducting sleeve (e.g., in an internal bearing of the types shown in FIGS. 5 and 6) is tapered or otherwise not uniform along its length. This is a constant force if the bearing coil is in the persistent mode. The persistent mode technique is discussed below.

Mode Suppression and Damping

As explained above, the mode of the unmodified gravimeter of the type shown in FIG. 1 is probably an azimuthal oscillation of the superconducting sphere. However, in designing a bearing it is prudent to suppress all possible modes.

Rotational modes are characterized by the superconducting sphere spinning on an internal axis. A bearing (e.g., as shown in any of FIGS. 3–6) with a cylindrical cross section will suppress all rotations except that coaxial with the bearing. To suppress the rotational mode coaxial with the bearing, it is necessary to break the cylindrical symmetry of the bearing. This may be done, for example, by ovalizing or flattening the sleeve of the internal bearing, and ensuring that the bearing coil generates a field that lacks azimuthal symmetry about the bearing's axis.

Orbital modes are characterized by motions in the horizontal plane for which the kinetic and potential energies are individually time invariant. The centering force of a bearing of a type shown in any of FIGS. 3, 5 and 6 will not substantially contribute to the suppression of these modes. It has been estimated [W.A. PROTHERO, A CRYOGENIC GRAVIMETER, Ph.D. dissertation, University of California, San Diego (1967)] that the centering force on the sphere in the conventional GWR gravimeter is 1100 dyne/cm. Therefore, bearings of a type shown in any of FIGS. 3–6 may make it somewhat harder to excite the mode, but once the mode is excited it will remain undamped. Again, the solution is to break all symmetries of the bearing system. For example, an ovalized or flattened bearing sleeve will effectively prevent any orbital motion.

Vibrational modes are not suppressed by a bearing. In fact, the bearing tends to convert rotational and orbital modes into vibrational modes. However, the stronger the restoring force in the bearing, the higher will be the frequency of these modes. In general, higher-frequency modes can be damped more rapidly than those at lower frequencies.

There is a mode which is peculiar to structures such as that shown in FIG. 5. A pendulum mode can develop if the sphere can move off-axis relatively freely while a short section of the bearing sleeve is held on axis by the field of the bearing coil. The mode can be blocked by using two bearings (e.g., a bearing at the top and a bearing at the bottom of the sphere), or by lengthening the active region of bearing coil 510.

A properly designed bearing will suppress rotational and orbital modes, and increase the frequency of vibrational modes. The resulting vibrational modes can be damped by ensuring that bearing motion causes eddy current to circulate in normal metal (i.e., nonsuperconducting) structures. As will become evident in the calculations below, each vibrational mode creates a different pattern of eddy currents, so that each mode has, in general, a unique damping rate. To obtain the fastest dissipation of energy, the magnetic field strength, and the conductivity, volume, and linear dimensions of the normal metal should be maximized. These requirements are conveniently met by supporting the bearing coil on a high-conductivity metal bobbin or coil form. Both force and damping considerations dictate that the clearance between the bearing sleeve and the metal bobbin or coil form be minimized. The bobbin or coil form is preferably of high-purity copper, although metallic silver or gold may be used if desired.

Center of Mass and Center of Buoyancy

Current in the bearing coils will tend to centralize the sleeves. However, it is advantageous for the levitated body to float with the sleeves aligned coaxially with the bearing bobbins even in the absence of magnetic centering forces. The bearing will then assist the force of gravity, rather than fighting it.

Figure 7:
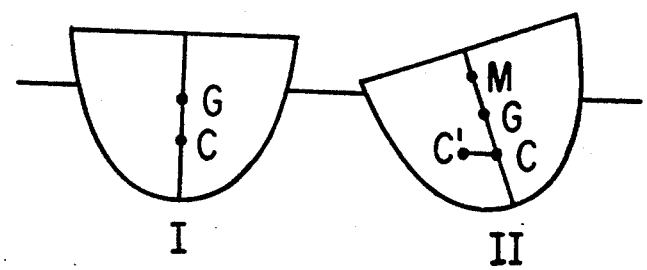
FIG. 7 is a diagram illustrating the prior-art principle of stability of a buoyant object.

The stability of the sphere and bearing can be compared to that of a boat floating in water. See, e.g., R.B. LINDSAY, PHYSICAL MECHANICS, D. Van Nostrand Company, Inc. (1961), pp. 359–360. As illustrated in FIG. 7, the center of gravity (G) of the boat is defined by its material structure, while the center of buoyancy (C) is at the center of gravity of the displaced volume of water. The center of gravity (G) is typically above the center of buoyancy (C). When the boat rolls, the center of gravity (G) remains fixed relative to the ship's structure, while the center of buoyancy (C) moves off axis. The center of curvature of the trajectory of the center of buoyancy is called the metacenter (M). The boat will be stable if the metacenter (M) is above the center of gravity (G); the boat will be unstable if the metacenter (M) is at or below the center of gravity (G).

The "buoyancy" of the sphere in a gravimeter of the type shown in FIG. 1 is a result of the repulsion between the levitation coils 112 and the induced currents on the superconducting surface of sphere 110. By using the well-known method of images, the complicated distribution of surface currents can be replaced by two image currents. The magnitude and location of the image currents of a sphere supported by current loops may be readily calculated. See, e.g., W.A. PROTHERO, A CRYOGENIC GRAVIMETER, Ph.D. dissertation, University of California, San Diego (1967); and A. SEZGINER and W.C. CHEW, IMAGE OF A STATIC CURRENT LOOP OVER A SUPERCONDUCTING SPHERE, unpublished report (August 1989).

Figure 8:
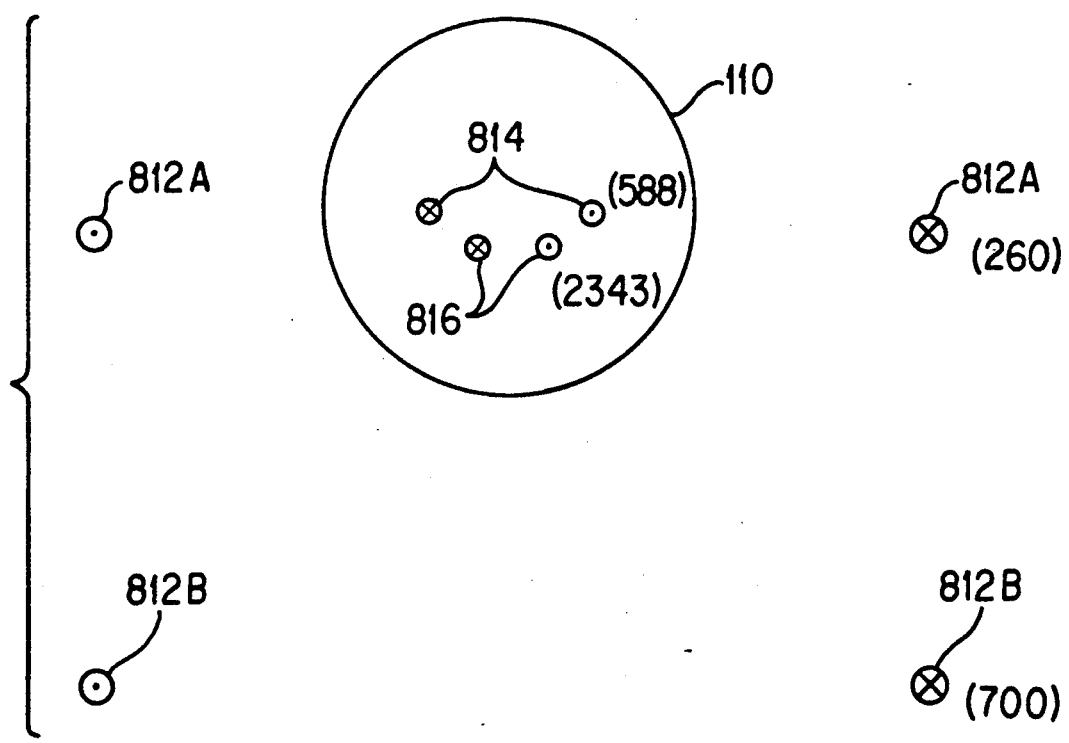
FIG. 8 illustrates the image currents that mimic a one-inch diameter superconducting sphere in a superconducting gravimeter of the type shown in FIG. 1.

FIG. 8 illustrates the image currents that mimic a one-inch diameter superconducting sphere in the standard GWR gravimeter of the type shown in FIG. 1. It will be recalled that horizontal coils 112 of FIG. 1 supply the levitation force for superconducting sphere 110. The upper levitation coil, shown at 812A in FIG. 8, typically carries 260 amp-turns. The lower levitation coil, shown at 812B in FIG. 8, typically carries 700 amp-turns. Each of these real currents induces a horizontal, countercirculating image current inside the sphere 110, as shown diagrammatically at 814 and 816 in FIG. 8. The magnetic moments of the two images are roughly comparable, so the center of buoyancy is about midway between them, 1.5 mm below the center of the sphere. As the sphere is rotated, the locations of the images remain unchanged, so the metacenter of the sphere coincides with its geometrical center.

Unfortunately, it is more difficult to calculate the location of the center of buoyancy in the presence of superconducting bearing sleeves, particularly when the sphere is rotated so that the sleeves are no longer on the vertical center line of the instrument. Hence, the location of the metacenter has not been calculated.

If, in the presence of bearing sleeves, the center of buoyancy remains near the geometrical center of the sphere, the metacenter might also be near the geometrical center. In this case, it is essential that the center of mass be below the geometrical center.

Figure 9:
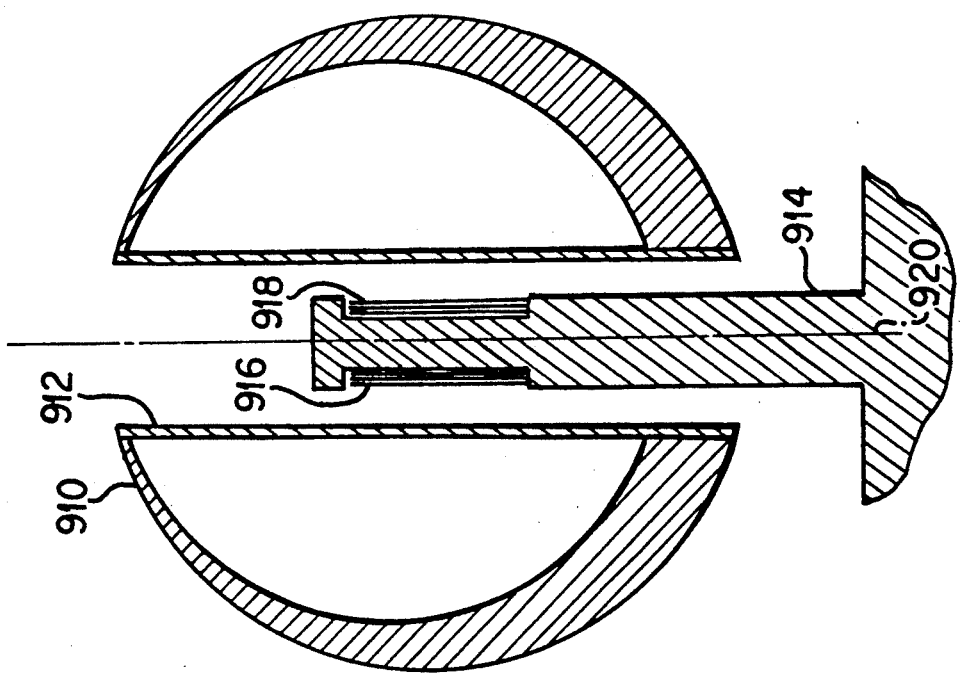
FIG. 9 shows a diagrammatic cross-section of a bottom-weighted spherical shell with a centered internal bearing in accordance with the invention.

The greater the distance of the metacenter above the center of mass, the greater the righting moment of the levitated body. Lowering the center of mass is the simplest way of maximizing the righting moment. One way to do this is to use only one bearing in a single sleeve attached to the bottom of the sphere. A second method, which can be used if two bearings are desired, is to make the lower bearing sleeve substantially heavier than the upper bearing sleeve. A third method, suitable when using a sphere with a thick wall, is to make the wall thickness of the shell greater at the bottom than at the top of the sphere, as shown diagrammatically in FIG. 9. This allows a bearing to be more or less centered in the sphere while retaining gravitational stability. As shown in FIG. 9, a bottom-weighted, spherical, superconducting shell 910 is provided with an internal, superconducting bearing sleeve 912, within which is a support 914 carrying a pair of vertical bearing coils 916 and 918. Sleeve 912 is aligned with axis 920 when coils 916 and 918 are energized. Other techniques of stability are also possible. For example, the bottom end of the bearing sleeve of FIG. 34 (discussed below) could be made more massive at the bottom by tapering the outside surface, or a small weight can be fixed internally or externally to the sphere.

Bearing Design

Figure 10:
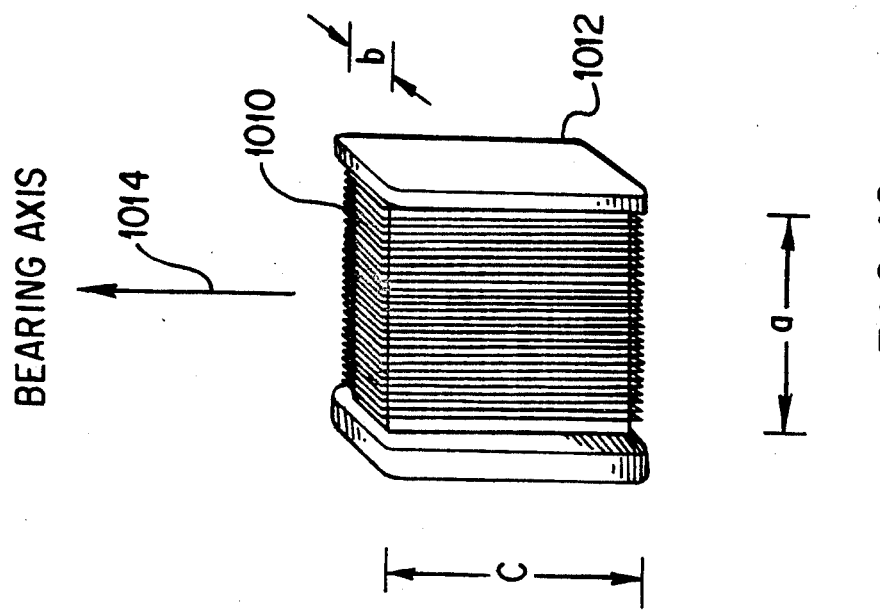
FIG. 10 is a perspective view of an example bearing coil in accordance with the invention.
Figures 11A, 11B, 11C:
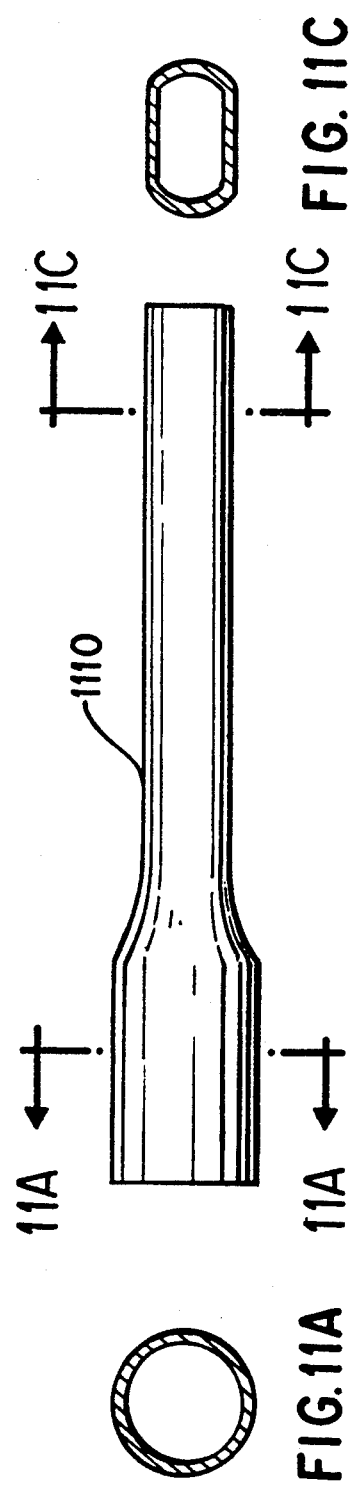
FIG. 11A is a sectional view of a bearing sleeve in accordance with the invention, taken along line 11A—11A of FIG. 11B.
FIG. 11B is a side view of a bearing sleeve in accordance with the invention.
FIG. 11C is a sectional view of a bearing sleeve in accordance with the invention, taken along line 11C—11C of FIG. 11B.

A number of bearings which have been constructed are described in detail below, together with results of the experiments performed with them. One of the bearings will be used as an example in the calculations of bearing properties. As shown in FIG. 10, the example bearing coil 1010 comprises a niobium wire wound on a rectangular bobbin 1012 with dimensions a=5 mm, b=3 mm, and c=20 mm. The niobium wire is insulated with enamel, and has a diameter of 0.125 mm; hence the double-layer coil has 16 turns/mm. Coil 1010 is potted to prevent movement of the turns. The magnetic field is predominantly horizontal, i.e. perpendicular to the axis 1014 of the bearing sleeve. Bobbin 1012 is cut from high-purity copper, and is mounted in the gravimeter so that its vertical axis coincides precisely with the vertical axis of the main levitation coil set 112 (see FIG. 1). A side view of the bearing sleeve is shown at 1110 in FIG. 11B. Bearing sleeve 1110 is a thin-walled, niobium cylinder, approximately 50 mm long and partially flattened or ovalized at one end, as shown by the sectional view of FIGS. 11A and 11C. The clearance between sleeve 1110 and bobbin 1012 is preferably about 1 mm.

FIG. 12A is a partial sectional view of a gravimeter of the type shown in FIG. 1, modified to include upper and lower bearings having bearing coils and sleeves as shown in FIG. 10 and 11A–11C. Superconducting sphere 1210 has an upper sleeve 1212 and a lower sleeve 1214 affixed to it, the centerlines of the sleeves coinciding with the vertical axis passing through the center of the sphere. Sphere 1210 is levitated by coils 1216 and 1218 in conventional fashion. For simplicity of illustration, elements such as the position-sensing capacitor plates surrounding the sphere are not shown. Main coil form 1220 has an upper support 1222 and a lower support 1224 affixed to it. An upper bearing coil bobbin 1226 mounted on upper support 1222 extends downwardly within sleeve 1212, while a lower bearing coil bobbin 1228 mounted on lower support 1224 extends upwardly within sleeve 1214. An upper bearing coil 1230 having vertically-disposed windings is carried by upper coil bobbin 1226, and a lower bearing coil 1232 having vertically-disposed windings is carried by lower coil bobbin 1228. An additional upper coil 1234 having horizontally-disposed windings may be added to assist centralization of upper sleeve 1212; similarly, a lower coil (not shown) having horizontally-disposed windings may be added to assist centralization of lower sleeve 1214. FIG. 12B is a view taken along section line 12B—12B of FIG. 12A, showing the ovalized cross-section of lower sleeve 1214 and a top view of bobbin 1228 and coil 1232.

Force Gradient Between Parallel Planes

The calculated quantities of interest are the centering force gradient, the frequency of all vibrational modes, and the damping time constant of the vibrational modes. The bearing effectively blocks the excitation of rotational and orbital modes. The exact calculation of these quantities requires numerical techniques, such as the finite element method. Instead of exactly calculating these quantities, analytical models have been developed which provide approximate predictions of performance. Analytical solutions are only possible for planar and circularly symmetric geometries. Actual bearing geometries fall between these two extremes.

The force gradient depends on the direction of displacement. Two cases will be considered: horizontal displacement parallel to the coil axis, and horizontal displacement perpendicular to the coil axis. If the sleeve is uniform in the vertical direction, there will be no force gradient in that direction.

To calculate the force, the method of images is used. For superconductors, the technique is identical to that used for the calculation of high frequency magnetic fields in the vicinity of ordinary metals. In both cases, the magnetic field is prevented from penetrating the solid surface by eddy currents. The normal component of the magnetic field is zero at the interface. Because superconductors are lossless, the eddy currents exist even at zero frequency, and the method of images is useful even in that limit.

Figure 13:
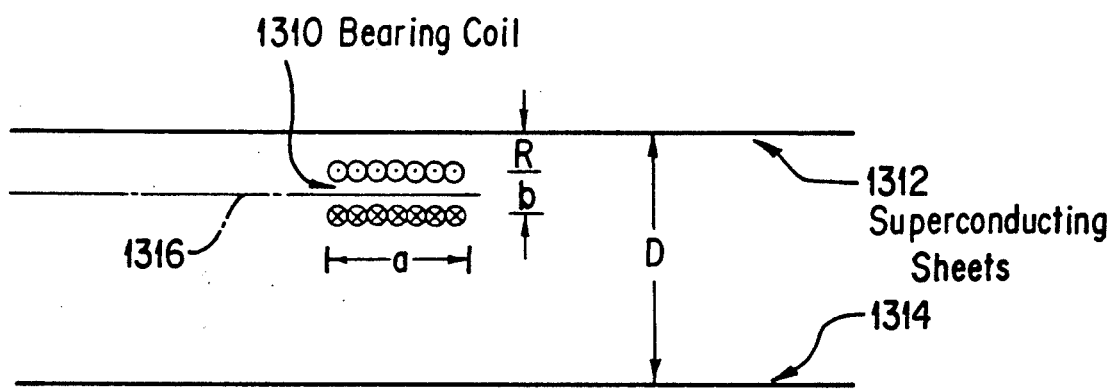
FIG. 13 shows in cross-section a model of a vertical coil 1310 placed between two infinite superconducting planes 1312 and 1314.

FIG. 13 shows in cross-section a model of a vertical coil 1310 placed between two infinite superconducting planes 1312 and 1314. It is desired first to calculate the force for horizontal displacements perpendicular to the coil axis 1316 of coil 1310.

Figure 14:
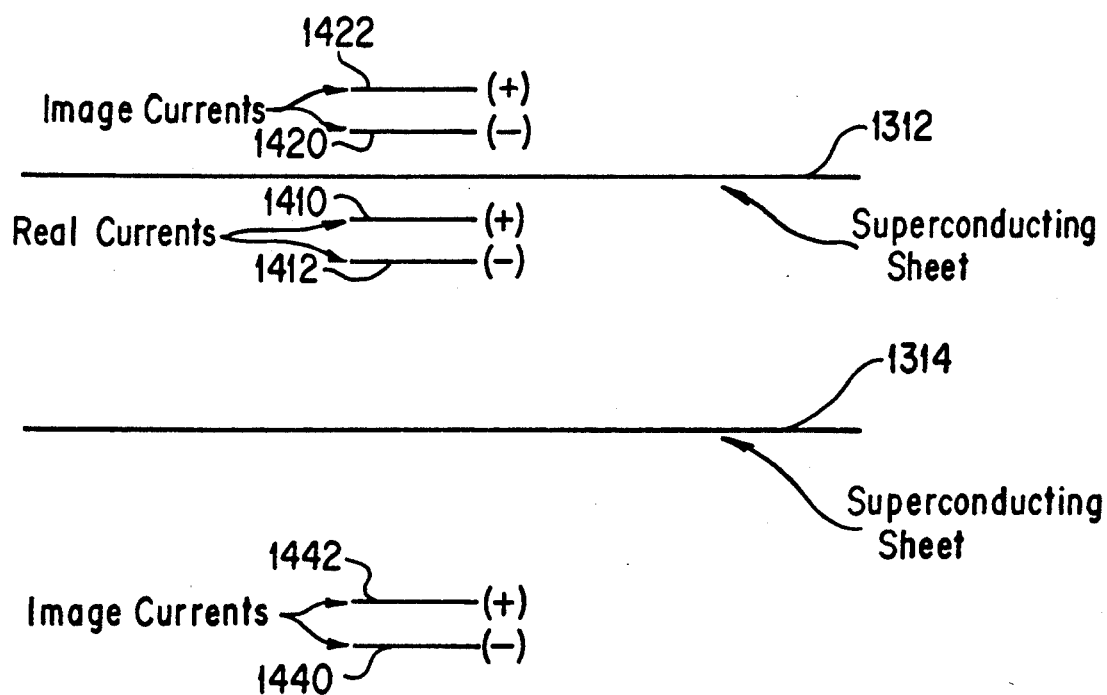
FIG. 14 is a transformation of the model of FIG. 13 showing real and image currents useful for calculating forces of horizontal displacement perpendicular to the coil axis.

As shown in FIG. 14, coil 1310 is approximated as two sheets of current, 1410 and 1412; in one the current flows upwards and in the other it flows downwards. The superconducting bearing sleeve is approximated by two infinite superconducting sheets 1312 and 1314. Each current sheet has an image, of equal but opposite current, in each wall of the bearing sleeve; that is, current sheet 1410 has an image 1420 of equal but opposite current in superconducting sheet 1312, current sheet 1410 has an image 1440 of equal but opposite current in superconducting sheet 1314, current sheet 1412 has an image 1422 of equal but opposite current in superconducting sheet 1312, and current sheet 1412 has an image 1442 of equal but opposite current in superconducting sheet 1314.

Such current sheets repel each other if the currents are antiparallel, and attract each other if the currents are parallel. An image in one wall also has an image in the opposite wall, ad infinitum. A repulsive force results from the interaction of the real currents with the infinitude of images. The sum is convergent. For the purpose of illustration, only the leading order terms will be calculated.

The force F between current sheet, of width a and height c, and a parallel superconducting surface at a distance R is the same as the force between two identical sheets of current separated by 2R. The currents in the two sheets are antiparallel so the force is repulsive. The equation is $$F = \frac{\mu_0}{4\pi} N^2 I^2 \frac{4c}{a} \left( \tan^{-1}\left(\frac{a}{2R}\right) - \frac{1}{2}\left(\frac{2R}{a}\right)\log\left(1 + \left(\frac{a}{2R}\right)^2\right) \right) \tag{1}$$

where $\mu_0$ is the permeability of free space and N is the number of turns in the coil. Algebraically summing the forces between the real currents and their lowest order images shows that the force is linear with displacement from the center. The force gradient for the coil and sleeve parameters given with reference to FIG. 10 is $3.80 N/(m-A^2) = 3800$ dyne/(cm$-A^2$).

Figure 15:
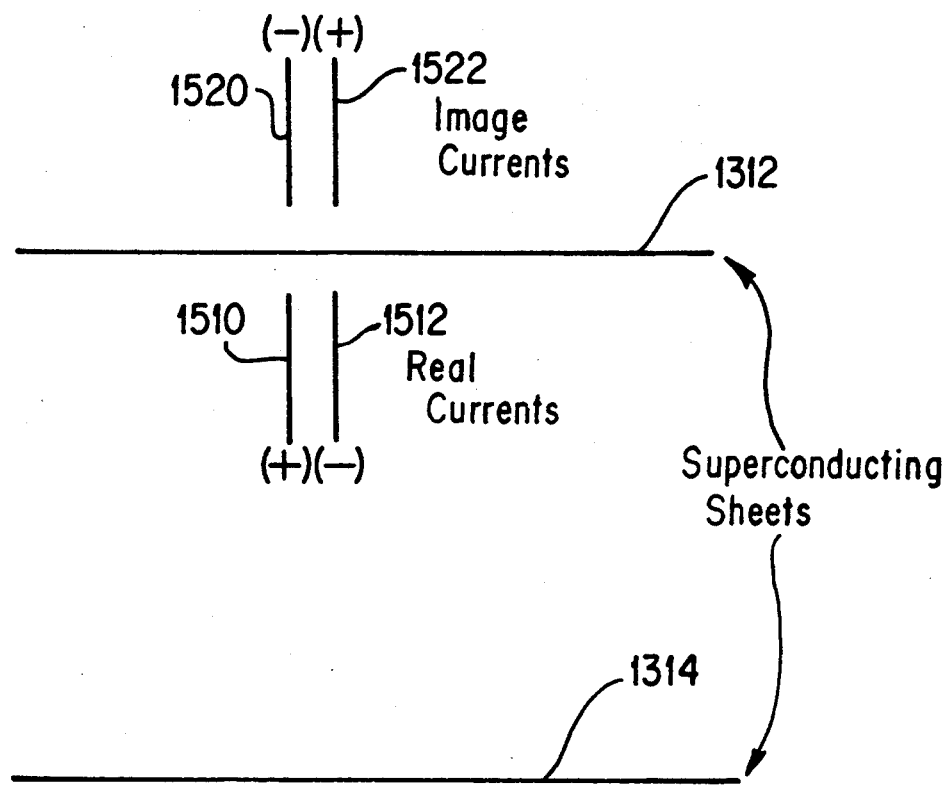
FIG. 15 is a transformation of the model of FIG. 14 showing real and image currents useful for calculating forces of horizontal displacement parallel to the coil axis.

The force gradient for a horizontal displacement parallel to the coil axis is diagrammed in FIG. 15. In this case, coil 1310 is approximated as two sheets of opposing, real current, 1510 and 1512. The superconducting bearing sleeve is approximated by two infinite superconducting sheets 1312 and 1314. Each current sheet has an image, of equal but opposite current, in each wall of the bearing sleeve; that is, current sheet 1510 has an image 1520 of equal but opposite current in superconducting sheet 1312, current sheet 1510 has an image 1540 of equal but opposite current in superconducting sheet 1314, current sheet 1512 has an image 1522 of equal but opposite current in superconducting sheet 1312, and current sheet 1512 has an image 1542 of equal but opposite current in superconducting sheet 1314.

In general, we must know the force between two current sheets which are parallel but not coplanar. The distance between the planes is denoted b. The other symbols are the same as in the previous equation. The force F between two current sheets is $$F = \frac{\mu_0}{4\pi} N^2 I^2 \frac{2c}{a} \left\{ \frac{b}{a}\left( \tan^{-1}\left(\frac{2R+2a}{b}\right) - 2\tan^{-1}\left(\frac{2R+a}{b}\right) + \tan^{-1}\left(\frac{2R}{b}\right)\right) + \log\left(\frac{(2R+2a)^2 + b^2}{(2R+a)^2 + b^2}\right) + \frac{R}{a}\log\frac{[(2R+2a)^2 + b^2][4R^2 + b^2]}{[(2R+a)^2 + b^2]^2} \right\} \tag{2}$$

As before, there is an infinite sum, of which we take only the leading terms. The force constant for the example given with reference to FIG. 10 is 3.71N/(m−A$^2$) or 3710 dyne/(cm−A$^2$). That the parallel and perpendicular force constants are similar is a fortuitous consequence of the choices of a and b.

These force gradients can be compared to those calculated by Prothero for the standard gravimeter of the type shown in FIG. 1. Prothero found that the horizontal force gradient is about 1000 dyne/cm. Thus, the bearings can be expected to reduce displacements of the sphere from the center line of the instrument by a factor of about four for a bearing current of one amp in the example given.

Force Gradient in Circular Cylinder

Figure 16:
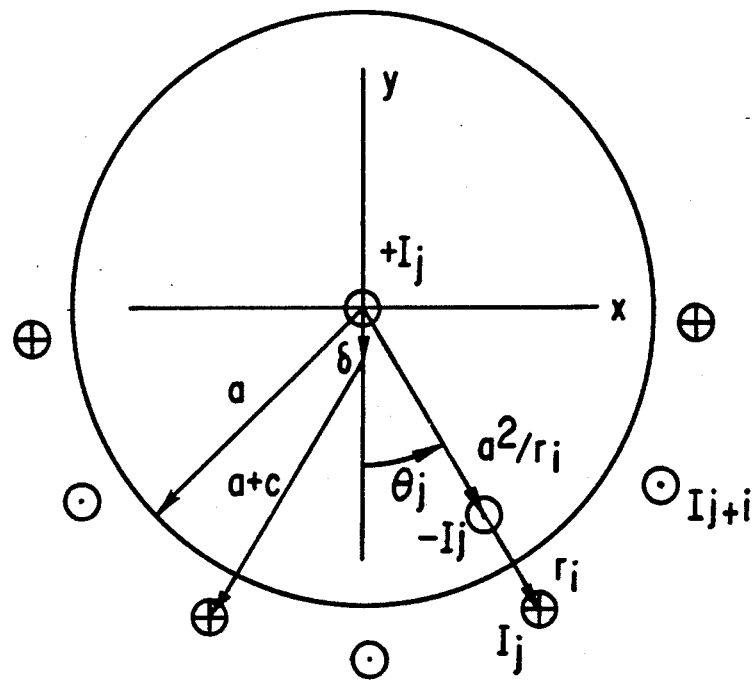
FIG. 16 is a prior-art illustration of a geometry used by Everitt and Worden for calculating force in the case of vertical bearing filaments outside a cylindrical sleeve having a circular cross section.

It is also useful to consider the case of vertical bearing filaments inside a cylindrical sleeve having a circular cross section. Everitt and Worden have presented the method of images solution to the problem of filaments outside and parallel to a superconducting cylinder. See C. W. F. EVERITT and P. W. WORDEN, JR., FINAL REPORT ON CONTRACT NAS8-32605 TO PERFORM LABORATORY RESEARCH ON SUPERCONDUCTING BEARINGS FOR APPLICATION IN CRYOGENIC EXPERIMENTS IN SPACE, Stanford University (1980). If the superconducting cylinder has radius a, and the wire carrying a current +I is a distance R from the center of the cylinder, then there are images at r=0 carrying current +I, and at r=a$^2$/R carrying a current −I. See FIG. 16.

Everitt and Worden's image solution can be transformed to be appropriate to the internal bearing problem. Consider two real wires inside a superconducting cylindrical shell at different azimuths $\theta_i$ and $\theta_j$, but at the same radius a$^2$/R, one carrying current +I and the other carrying current −I, and two more wires at r=0, one carrying current in each direction. Then there will be appropriate image currents at a radius r=R. The currents at r=0 sum to zero and are ignorable. We sum the forces between pairs of real and image wires. Forces between pairs of real wires are irrelevant. Currents running in the same direction attract while those running in opposite directions repel. The total force F is $$F = \frac{\mu_0 I^2}{2\pi} \sum_i \sum_j (-1)^i (-1)^j \cdot \frac{r_j \cos\theta_j - r_i \cos\theta_i}{r_i^2 + r_j^2 - 2r_i r_j \cos(\theta_j - \theta_i)} \quad (3)$$

where the index i runs over the image currents and the index j runs over the real currents.

If the wires are equally spaced azimuthally, the force is zero when the bearing is centered. To calculate the force gradient, the bobbin and sleeve are displaced relative to each other along the x-axis, the image locations recalculated, and Equation [3] employed. Although the images near r=0 are displaced from each other slightly, we continue to ignore them.

Mode Frequency

As pointed out above, all surviving modes of the sphere with bearing are vibrational modes. Modes whose motions are linear have frequencies given by $$\omega = \sqrt{\frac{k}{m}} \quad (4)$$

where k is the force constant and m is the mass of the sphere plus sleeves. The frequencies of the torsional modes have a similar form $$\omega = \sqrt{\frac{k_T}{I}} \quad (5)$$

where $k_T$ is the torque constant and I is the appropriate moment of inertia. Because the force or torque constants of all modes are proportional to the square of the bearing current, the frequencies are directly proportional to the currents.

For the example given with reference to FIG. 10, the fundamental frequency is the same for the two types of motion considered. For a 4 g superconducting sphere, which is typical, the period is $2\pi/\omega$=(0.2 s-A)/I.

Energy Dissipation

Possibly the most important function of the bearing is to dissipate energy. The current in the bearing coil causes currents to flow on the surface of the superconducting sleeve. These currents prevent the magnetic field from penetrating the superconducting material, and maintain the constancy of the flux within each interior cross section of the cylinder. When the sleeve moves relative to the bobbin, the spatially-varying magnetic field created by the sleeve currents causes a time-varying field within the bobbin, inducing eddy currents. The ohmic losses experienced by these eddy currents extract mechanical energy from the motion of the sleeve and sphere.

The trajectory of the eddy currents depends on the trajectory of the sleeve. Each possible mode is damped at a different rate. However, the decay constants of all modes have the same dependence on bearing current, bobbin conductivity, and the mass of the levitated body. A representative calculation of the damping rate for one mode is as follows, with reference to FIG. 20.

Figure 20:
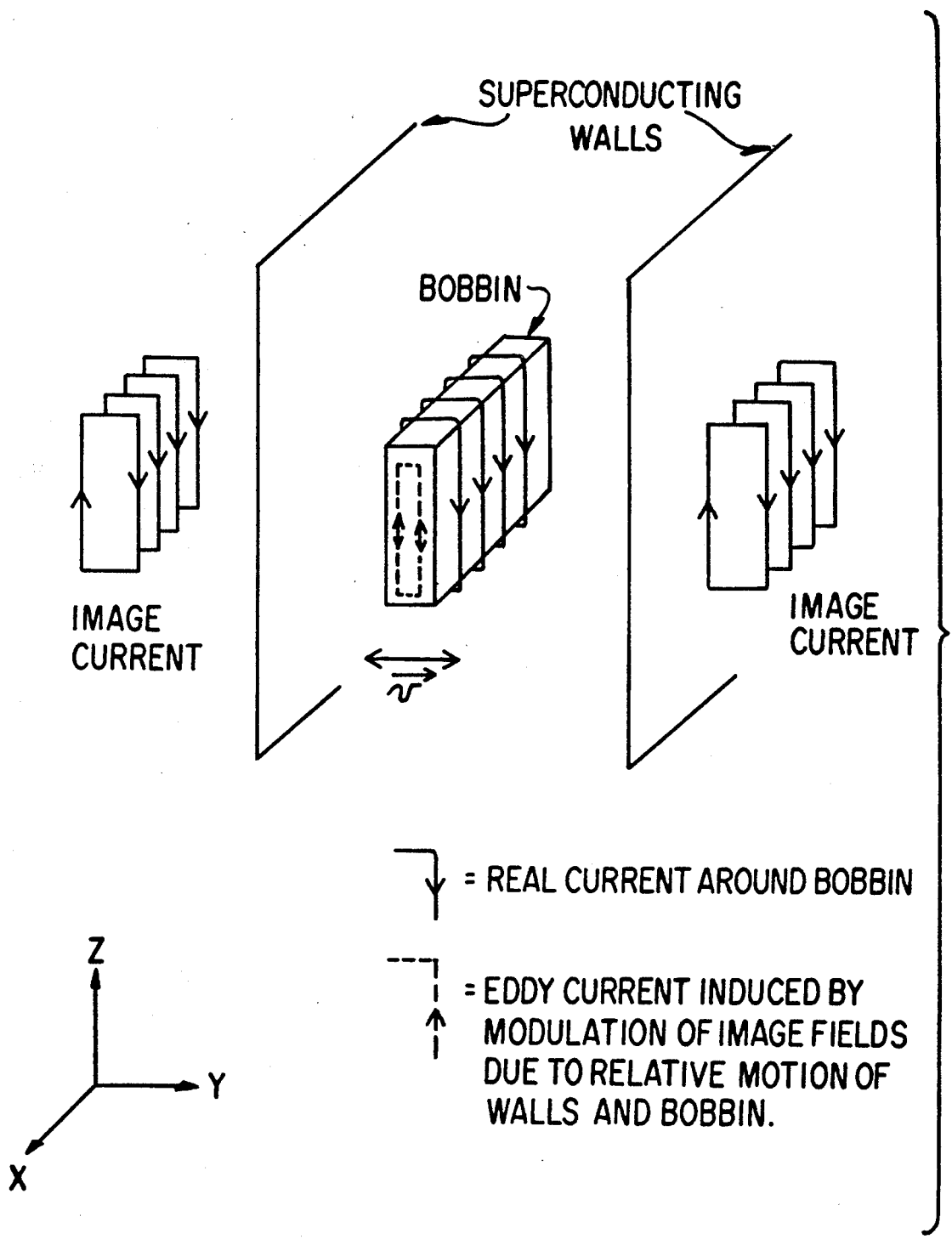
FIG. 20 is a schematic illustration of a model used for calculating contactless dissipation of energy.

Contactless Dissipation of Energy
Induced Current in Coil Bobbin (See FIG. 20)

Maxwell's equation:

$$\cdot dl = -\frac{\partial}{\partial t} \int B \cdot dA + (v \times B) \cdot dA$$

For the example mode, the first term is most important $$\cdot dl = -\frac{\partial \zeta}{\partial t} \int \frac{\partial B}{\partial \zeta} \cdot dA$$

where $\zeta$ is wall displacement from centralized position $$\frac{\partial \zeta}{\partial t} = \omega \zeta_0 \cos\omega t$$

where $\zeta_0$ is amplitude of motion.

Assuming no z-dependence of fields:

$$\frac{\partial B_x}{\partial \zeta}(x_p, y_p) = \frac{\mu_0 n I}{\pi} \sum_{i=1}^{4} (-1)^i \left( \frac{x_{ia} - x_p}{(x_{ia} - x_p)^2 + (y_i - y_p)^2} - \right.$$

$$\left. \frac{x_{ib} - x_p}{(x_{ib} - x_p)^2 + (y_i - y_p)^2} \right)$$

where $(x_{ia}, y_i)$, $(x_{ib}, y_i)$ are the coordinates of the edges of the image currents, and n=turns/meter.

Numerical computation shows that $$\frac{\partial B_x}{\partial \zeta} \approx \beta \frac{y}{b/2}$$

where b is the bobbin thickness, $\beta$ is a constant, and $[\beta]$=Tesla/meter.

The electric field is thus $$z(y) = \tfrac{1}{2}\omega \zeta_0 \cos \omega t \beta \frac{y^2}{b}$$

and the induced current is $$J = \sigma \mathcal{E} \quad \text{so}$$

$$J_z(y) = \tfrac{1}{2}\omega \sigma \zeta_0 \cos \omega t \beta \frac{y^2}{b}$$

Dissipation Time Constant

Rate of Energy dissipation from eddy currents:

$$\frac{\partial E}{\partial t} = \int \frac{J^2}{\sigma} dV$$

where $\sigma$=conductivity of bobbin $$<\cos^2 \omega t> = \tfrac{1}{2}$$

$$\frac{\partial E}{\partial t} = \frac{1}{320} \omega^2 \sigma \zeta_0^2 \beta^2 ab^3 c$$

where a=bobbin length, b=bobbin width, and c=bobbin height.

The frequency can be written as $$\omega^2 = \frac{K}{m}$$

where K=force constant ($\neq \beta$), and m=(mass of sphere+bearing sleeves).

The energy in the mode:

$$E = \tfrac{1}{2} K \zeta_0^2 \quad \text{so}$$

$$\frac{1}{E} \frac{\partial E}{\partial t} = \frac{\sigma \beta^2}{160 m} ab^3 c$$

$$\tau = \frac{160 m}{\sigma \beta^2 ab^3 c}$$

Sample values:
m=6×10$^{-3}$ Kg (niobium sphere+bearing sleeves)
$\sigma$=10$^{10}$($\Omega$·m)$^{-1}$ (OFHC copper at 4.2° K.)
$\beta$=(1 Tesla/Amp·meter)·I, where I=current in bearing
$\tau$=(120 sec·Amp$^2$)/I$^2$ Bobbin dimensions:
a=5×10$^{-3}$ meter
b=2×10$^{-3}$ meter
c=2×10$^{-2}$ meter For the mode considered, a horizontal oscillation, the decay time constant is $$\tau = \frac{160 m}{\sigma \beta^2 ab^3 c} \tag{6}$$

where m is the mass of the levitated body, $\sigma$ is the conductivity of the bobbin, a and b are the cross-sectional dimensions of the bobbin (which is assumed to be rectangular), c is the length of the coil, and $\beta$ is the appropriate transverse gradient of the magnetic field generated by the currents in the sleeve. The magnetic field generated by the currents in the sleeve is linearly proportional to the magnetic field generated by the coil, and hence linearly proportional to the current in the coil. The damping constant is thus expected to be inversely proportional to the square of the bearing current.

Magnetic Field

Increasing the current in the bearing bobbin increases the centering force and decreases the damping time. However, if the current is too large, the magnetic field will exceed the superconducting critical field of the bearing sleeve. At this point, flux will be trapped into the sleeve, and the characteristics of the bearing will change radically, and often deleteriously.

The magnetic field at any point is the sum of the fields from the real currents and their images. Consider a current sheet whose vertical extent is much larger than any other relevant dimension. If the sheet carries a current I in each of its N wires and the width of the sheet is a, the field at a point a distance R from the center of the sheet is parallel to the sheet and equal to $$B = \frac{\mu_0 I N}{\pi a} \tan^{-1} \left( \frac{a}{2R} \right) \tag{7}$$

Of primary interest is the field at the superconducting surface. In this case the real and image currents are arranged symmetrically about the field point, and the total field is found by summing over the infinitude of image current sheets $$B = \frac{2\mu_0 I N}{\pi a} \sum_{n=0}^{\infty} \left[ \tan^{-1}\left(\frac{a/2}{nD + R}\right) - \tan^{-1}\left(\frac{a/2}{nD + R + b}\right) + \tan^{-1}\left(\frac{a/2}{(n+1)D - R - b}\right) - \tan^{-1}\left(\frac{a/2}{(n+1)D - R}\right) \right] \tag{8}$$

where D is the distance between the pair of superconducting sheets. The series is slowly convergent. The magnetic field at the surface of the sleeve is greatest when the clearance between the sleeve and the coil is a minimum. For the example bearing, the field is 230 gauss/amp when the clearance between coil and sleeve is 0.1 mm. This should be compared to the critical field of niobium at 4.5° K, which is about 2000 Gauss. Therefore, if the coil is prevented from getting closer than 0.1 mm to the sleeve, the bearing current should not exceed about 8 amps.

This calculation also indicates that the choice of sleeve materials is important. For example, lead is conveniently plated onto sleeves made of copper. However, the critical field of lead at 4.5° K is only 500 Gauss. It is apparent that much less centering force and damping can be applied when the sleeves are of lead.

Figure 17:
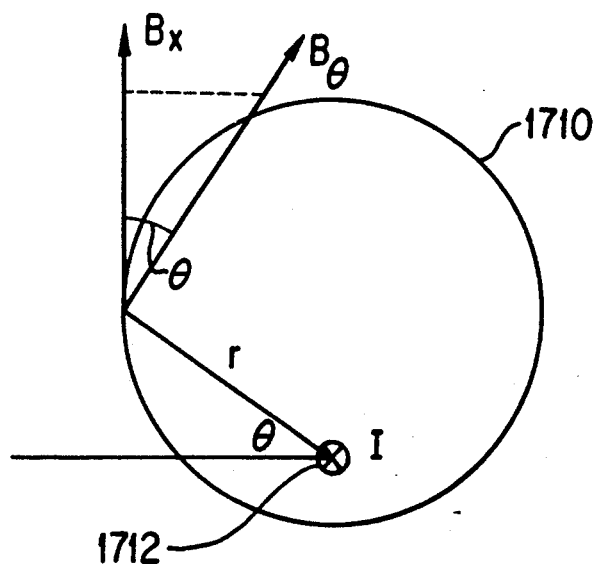
FIG. 17 illustrates a geometry for calculating tangential field $B_x$ at the inner surface of a superconducting cylindrical shell due to a vertical current passing through a wire inside the shell.

For the circular model, a similar summation over both real wires and images is employed. Again, the field will be only slightly overestimated if it is assumed that the wires are infinitely long parallel to the axis of the sleeve. Using this simplification, the field from each wire or image is $$B = \frac{\mu_0 I}{\pi r} \cos\theta \qquad (9)$$

where r is the distance between wire and field point, and $\theta$ is as defined in FIG. 17. FIG. 17 illustrates a geometry for calculating tangential field $B_x$ at the inner surface of a superconducting cylindrical shell 1710 due to a vertical current I passing through wire 1712 inside the shell.

Bearing Construction

A variety of bearing designs have been built and tested. In all cases the sphere was a 1.6 gram hollow niobium sphere, 1 inch in diameter. The bearing sleeves, weighing approximately 1 gram apiece, were thin-walled copper tubes plated with lead, or niobium tubes. They were fastened to the sphere using electrically-conductive epoxy. The sleeves were either cylindrical or flattened; a drawing of a typical flattened sleeve is shown in FIG. 11.

The bobbins were made of OFE-HIT copper having particularly high electrical conductivity at low temperature. In most of the tests the copper was used in its as-received state. In one test, the copper bobbin was annealed after machining; this increased its electrical conductivity by at least an order of magnitude. At the frequencies of interest (less than 1 Hz), the magnetic field totally penetrates the copper bobbin. The skin depth is long compared to the thickness of the bobbin, so eddy currents totally penetrate the copper mass.

Figure 18C:
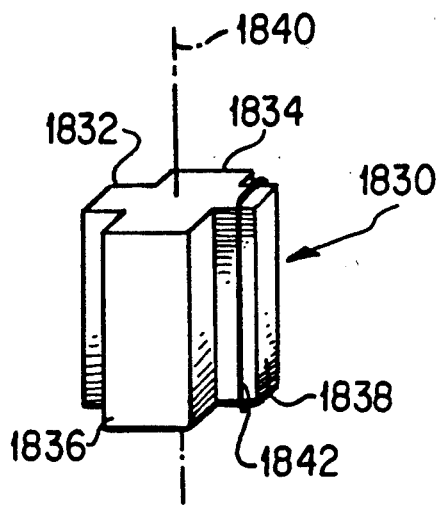
FIG. 18C is a perspective view of a bearing bobbin in accordance with the invention having an opposing pair of lugs which carry a respective pair of vertically-disposed coil windings in closely-spaced proximity.
Figure 18D:
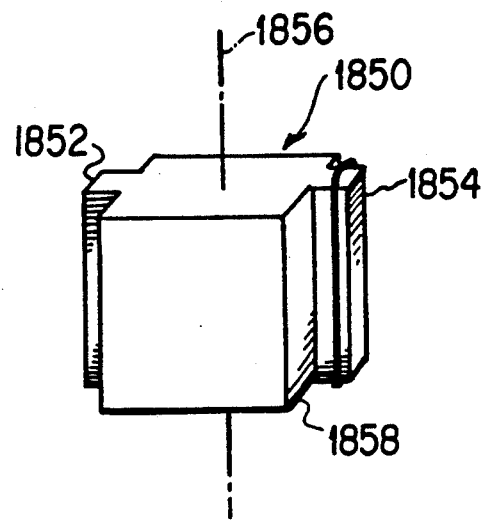
FIG. 18D is a perspective view of a bearing bobbin in accordance with the invention having an opposing pair of lugs which carry a respective pair of vertically-disposed coil winding more widely spaced from one another than with the bobbin of FIG. 18C.
Figure 18A:
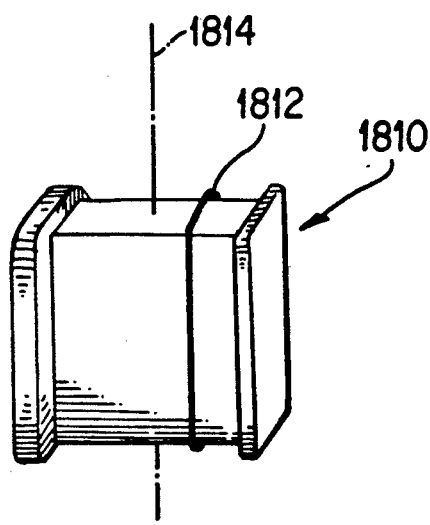
FIG. 18A is a perspective view of a bearing bobbin in accordance with the invention for carrying a vertically-disposed coil winding.
Figure 18B:
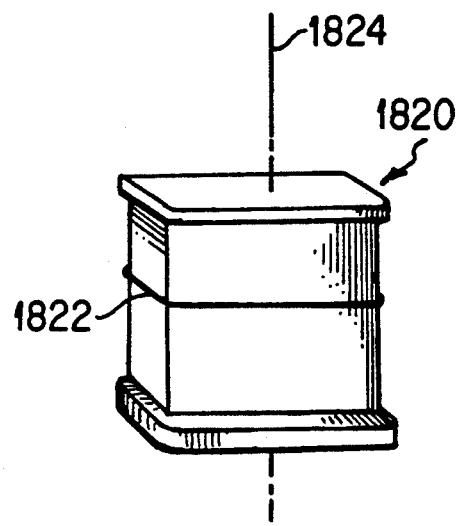
FIG. 18B is a perspective view of a bearing bobbin in accordance with the invention for carrying a horizontally-disposed coil winding.

Four different bearing bobbin designs were tested; these are sketched in FIGS. 18A, 18B, 18C and 18D. FIG. 18A shows in perspective view a bobbin 1810 on which an illustrative winding turn is shown at 1812, the winding being principally disposed in the vertical direction (indicated by vertical centerline 1814). FIG. 18B shows in perspective view a bobbin 1820 on which an illustrative winding turn is shown at 1822, the winding being principally disposed in the horizontal direction (orthogonal to vertical centerline 1824). FIG. 18C shows in perspective view a bobbin 1830 having four lugs 1832, 1834, 1836 and 1838 spaced about vertical centerline 1840. An opposing pair of the lugs, e.g., lugs 1832 and 1838, receive windings so as to provide two closely-spaced vertical coils. The illustrative winding turn shown at 1842 is principally disposed in the vertical direction. FIG. 18D shows in perspective view a bobbin 1850 having two lugs 1852 and 1854 on opposing sides of vertical centerline 1856 for receiving windings to provide a pair of well-spaced vertical coils. The windings on the two lugs are connected such that the magnetic fields are summed. The illustrative winding turn shown at 1858 is principally disposed in the vertical direction.

Figure 19:
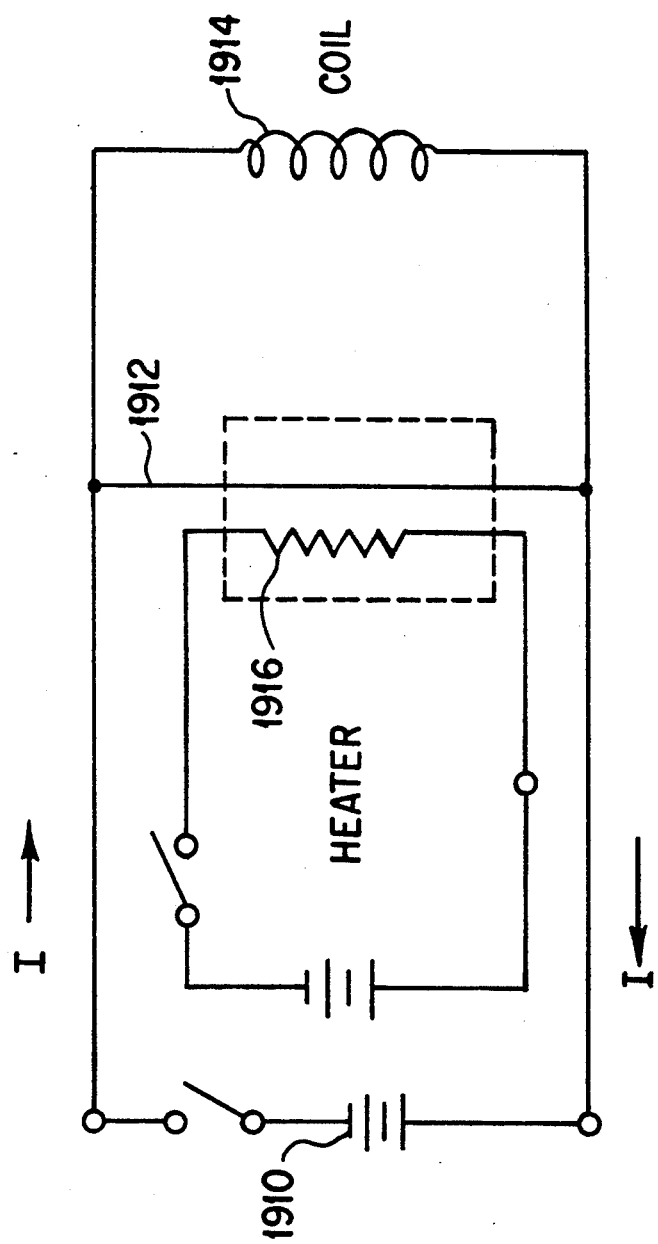
FIG. 19 is a schematic view of a persistent mode switch, used to trap current in a superconducting coil.

The bearing coils were wound from 0.125 mm niobium wire insulated with an enamel coating. The coils had persistent mode switches to ensure constancy of the current. The persistent mode switch, used to trap current in a superconducting coil, is shown schematically in FIG. 19. To put current into the coil a room-temperature current supply 1910 is turned on. Almost all current flows through the path having the lowest inductance, namely the short length 1912 of superconducting wire shorting the coil 1914. A heater 1916 is then activated, heating and thereby destroying the superconductivity in the short length 1912 of the niobium wire. Since coil 1914 is resistanceless at dc, and the short length 1912 of wire being heated has a finite resistance, soon all current is flowing through the coil. Then the heater is turned off, allowing the wire to cool and once again become superconducting; this does not change the distribution of current. As the current supply is turned off, current is redistributed into the short wire 1912, which is now superconducting, thus locking current into the closed superconducting loop. This current does not decay measurably over a period of years.

Experimental Results

An overview of the trial configurations is shown in FIGS. 21 through 30B. FIG. 21 is a schematic view of a sphere 2110 without bearings, used as a baseline case (a) for comparison with subsequent trials. Sphere 2110 has a hole 2112 drilled in it during manufacture. The mode, which was easily excited with small shocks, had a frequency of 0.006 Hz, and a decay time of about one hour.

FIG. 22A is a schematic sectional view of a configuration (b) having bearings above and below sphere 2210. That is, a bearing sleeve 2212 is affixed to the top and a bearing sleeve 2214 is affixed to the bottom of sphere 2210. Upper and lower vertical bearing coil assemblies 2216 and 2218 are disposed within the respective sleeves. FIG. 22B shows the relationship between the ovalized sleeve cross-section and the coil assembly within it. With this configuration, the gravimeter response was unstable and erratic, probably because the high center of mass of the sphere/sleeve assembly allowed easy tipping of the sleeves off the center line, allowing them to touch the coil bobbins.

FIG. 23A shows a schematic sectional view of a configuration (c) having a single bearing below sphere 2310. That is, a bearing sleeve 2312 is affixed to the bottom of sphere 2310. Vertical bearing coil assembly 2314 is disposed within sleeve 2312. FIG. 23B shows the relationship between the ovalized sleeve cross-section and the coil assembly within it. With this configuration, the center of mass of the sphere/sleeve assembly is below the center of buoyancy. A mode, with frequency 0.5 Hz, could be excited, and had a decay time of approximately one minute.

FIG. 24A shows a schematic sectional view of a configuration (d) having a single bearing below sphere 2410. That is, a cylindrical bearing sleeve 2412 is affixed to the bottom of sphere 2410. Vertical bearing coil assembly 2414 is disposed within sleeve 2412. FIG. 24B shows the relationship between the circular sleeve cross-section and the coil assembly within it. With this configuration, the center of mass of the sphere/sleeve assembly is below the center of buoyancy. In configuration (d) the sleeve was dimpled and possibly cracked (as shown by the break at 2416).

FIG. 25A shows a schematic sectional view of a configuration (e) having a single bearing below sphere 2510. Configuration (e) is identical to that of configuration (d) except that the sleeve is undamaged. That is, a cylindrical bearing sleeve 2512 is affixed to the bottom of sphere 2510. Vertical bearing coil assembly 2514 is disposed within sleeve 2512. FIG. 25B shows the relationship between the circular sleeve cross-section and the coil assembly within it.

Neither configuration (d) nor configuration (e) performed as well as configuration (c), and of these two the damaged sleeve 2412 gave better results than undamaged sleeve 2512. From these results it may be concluded that cylindrical symmetry must be broken to suppress the mode; the damage to sleeve 2412 in configuration (d) did this unintentionally.

FIG. 26A shows a schematic sectional view of a configuration (f) having a single bearing below sphere 2610. That is, a bearing sleeve 2612 is affixed to the bottom of sphere 2610. Vertical bearing coil assembly 2614 is disposed within sleeve 2612. FIG. 26B shows the relationship between the flattened sleeve cross-section and the coil assembly within it; in this case the bobbin is somewhat smaller and produces a relatively cylindrically symmetric field. The results of configuration (f) were similar to those of configuration (e).

FIG. 27A shows a schematic sectional view of a configuration (g) which is the same as configuration (f), except that the bobbin of coil assembly 2714 is of annealed copper. That is, a bearing sleeve 2712 is affixed to the bottom of sphere 2710. Vertical bearing coil assembly 2714 is disposed within sleeve 2712. FIG. 27B shows the relationship between the flattened sleeve cross-section and the coil assembly within it. The higher conductivity of the annealed copper bobbin in configuration (g) dramatically improved mode damping. The mode was overdamped, with decay times of a minute or less.

FIG. 28A shows a schematic sectional view of a configuration (h) in which the bobbin of vertically-wound coil assembly 2814 is larger and less symmetric. That is, a bearing sleeve 2812 is affixed to the bottom of sphere 2810. Vertical bearing coil assembly 2814 is disposed within sleeve 2812. FIG. 28B shows the relationship between the flattened sleeve cross-section and the coil assembly 2814 within it. The design and performance of configuration (h) are described in more detail below.

FIG. 29A shows a schematic sectional view of a configuration (i) which is the same as configuration (h) except that upper and lower bearings are provided. That is, a bearing sleeve 2912 is affixed to the top and a bearing sleeve 2914 is affixed to the bottom of sphere 2910. Upper and lower vertical bearing coil assemblies 2916 and 2918 are disposed within the respective sleeves. FIG. 29B shows the relationship between the flattened sleeve cross-section and the coil assembly 2918 within it. The same problems were encountered with configuration (i) as with configuration (b).

FIG. 30A shows a schematic sectional view of a configuration (j) having a single bearing below sphere 3010. That is, a bearing sleeve 3012 is affixed to the bottom of sphere 3010. A solenoid-wound bearing coil assembly 3014 having horizontally-disposed turns is located within sleeve 2312. FIG. 30B shows the relationship between the ovalized sleeve cross-section and the coil assembly 3014 within it. The design and performance of configuration (j) are described in more detail below.

Bearing with Vertical Windings (FIGS. 28A–28B, configuration (h))

The bearing bobbin design of configuration (h) is shown in FIG. 18D. It was machined from high-conductivity OFE-HIT copper. Two coils were mounted vertically on this bobbin, each having 64 turns of 0.125 mm niobium wire. The coils were wired in series so that their fields, which were predominantly horizontal, were additive. A persistent mode switch was used to stabilize the current.

The sleeve design of configuration (h) is shown in FIG. 11. Only one bearing sleeve, epoxied to the bottom of the hollow sphere, was employed. It was fabricated by machining a 50 mm long niobium cylinder with a wall thickness of approximately 0.125 mm. The cylinder was then flattened over most of its length. In this manner a round section could be readily mated to the surface of the sphere, while the flattened section extended over the length in which the bobbin was inserted.

Two types of shocks were used to test the efficacy of the bearing of configuration (h). In the first, a pulse of current was injected into the feedback coil of the gravimeter. This produces a purely vertical force on the sphere. The other kind of shock was a horizontal blow to the outside of the Dewar vessel in which the gravimeter was kept cold. This kind of mechanical shock, estimated to be a few hundred gals (i.e. a few tenths of g), produced a vertical disturbance and also often produced a horizontal disturbance.

Figure 2:
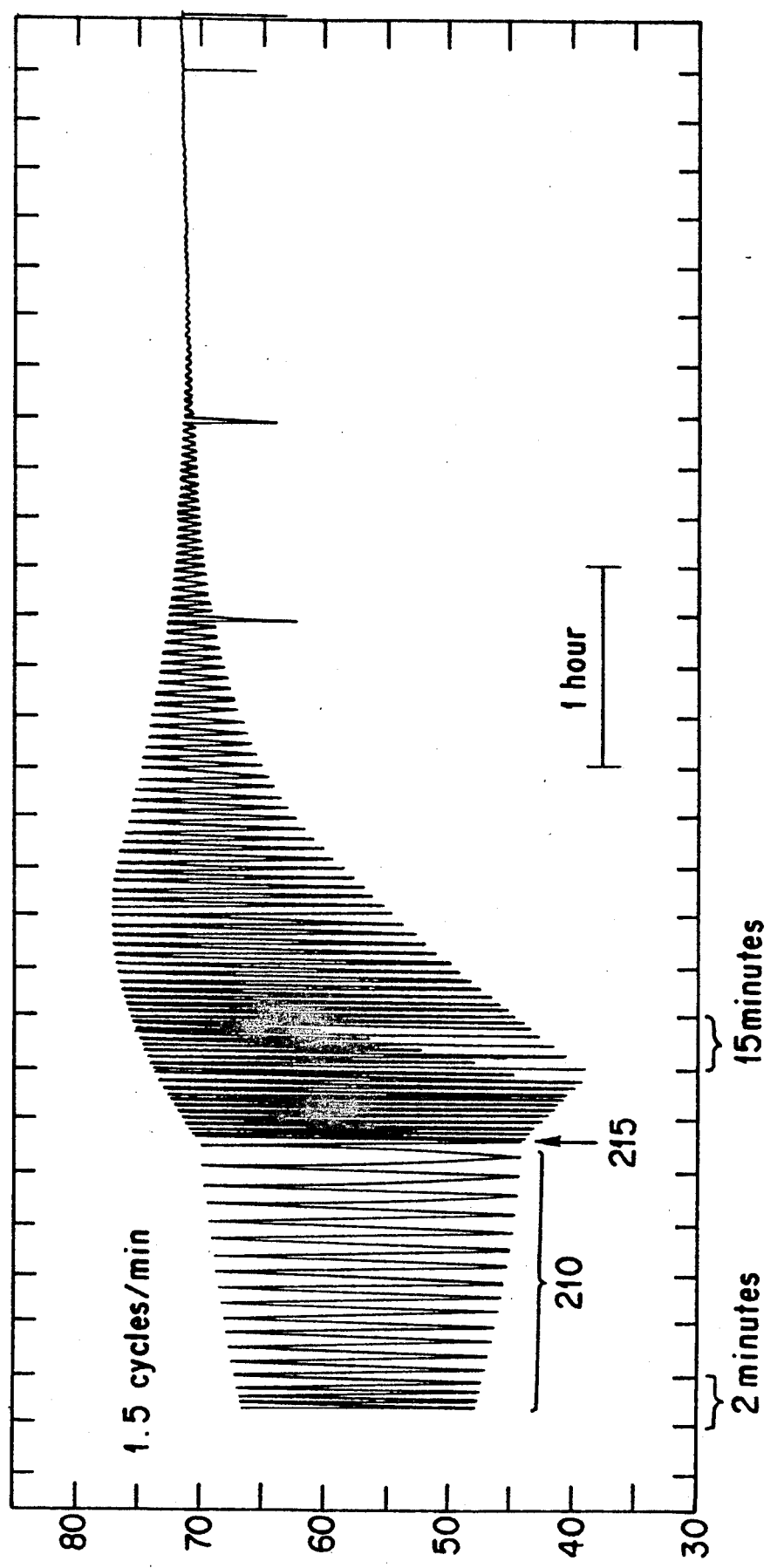
FIG. 2 is a sample gravity record made with a prior-art gravimeter of the type shown in FIG. 1 and showing exemplary mode effects.
Figure 31:
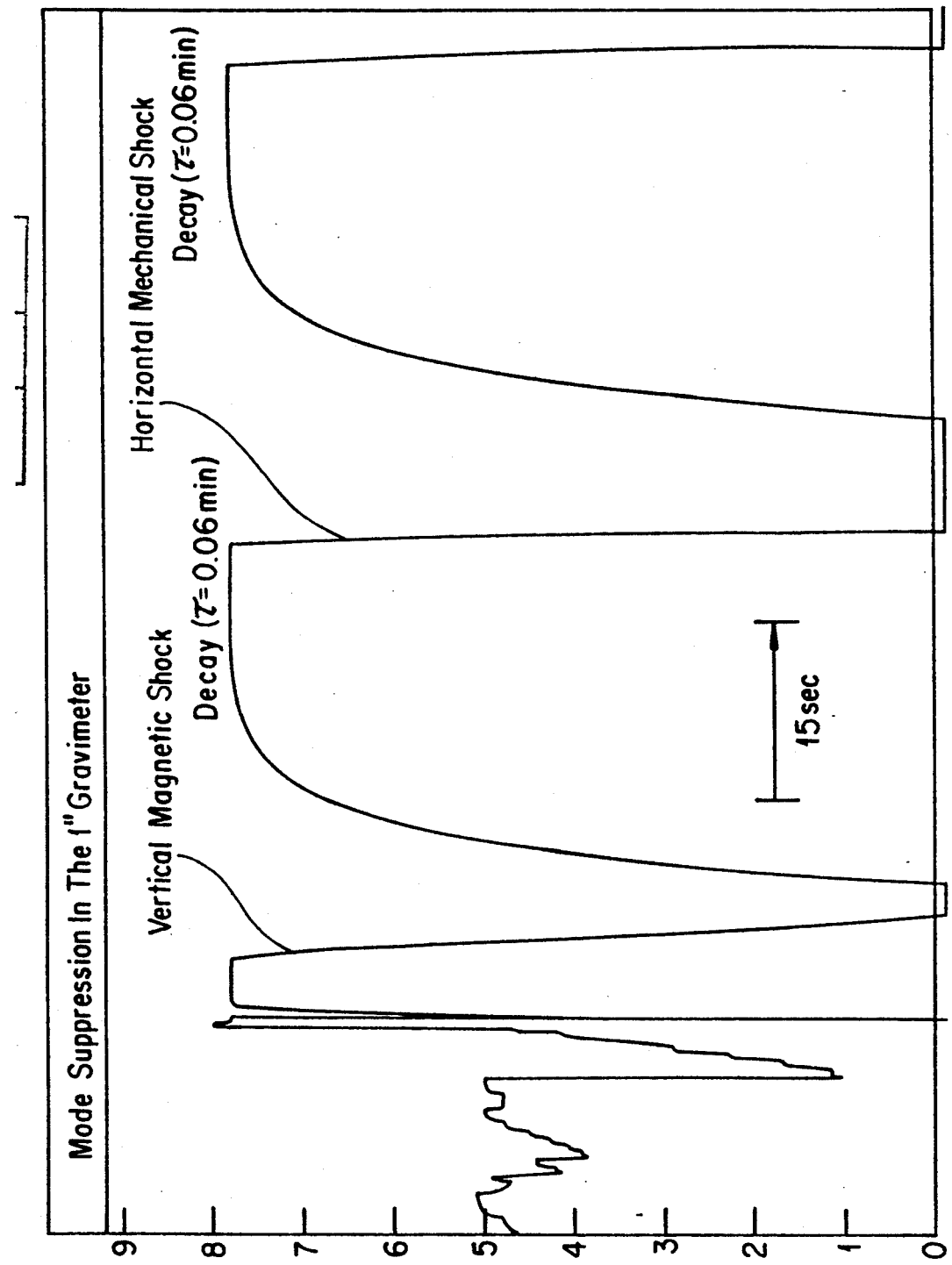
FIG. 31 is a time record showing mode decay performance of configuration (h) in accordance with the invention.

For bearing currents equal to or less than 125 mA, the mode could be The higher the bearing current, the faster the mode decayed. For currents of 250 excited. mA and above, the mode was overdamped, and no oscillations were observed. All decays appeared to be exponential. FIG. 31 is a typical time record, showing two exponential decays lasting less than a minute each. The record of FIG. 31 is directly comparable to FIG. 2, where a similar shock excited a mode lasting for hours in a gravimeter not equipped with a bearing.

Recovery from vertical shock (both magnetic and mechanical) depends on the vertical gradient of the levitation force and on the mechanical Q of the levitation system. Mechanical response measurements show that vertical motions of the sphere in the gravimeter, both with and without bearings are slightly overdamped. There is no dependence on bearing current, except through small changes to the levitation caused by bearing imperfections. This is not surprising. Vertical motions do not cause changes in the magnetic field inside the bearing sleeve, so no eddy currents are induced in the bobbin. Hence the bearing system should have no effect on vertical motions.

However, for a given vertical force gradient, the presence of the bearing increases the recovery time after vertical shock relative to that of a gravimeter with no bearing. For stiff gradients, the difference is only a few seconds. Presumably the sleeve alters the way in which eddy currents resulting from vertical sphere motion are excited in surrounding metal structures such as the position sensing capacitor and the levitation coil form.

Figure 32:
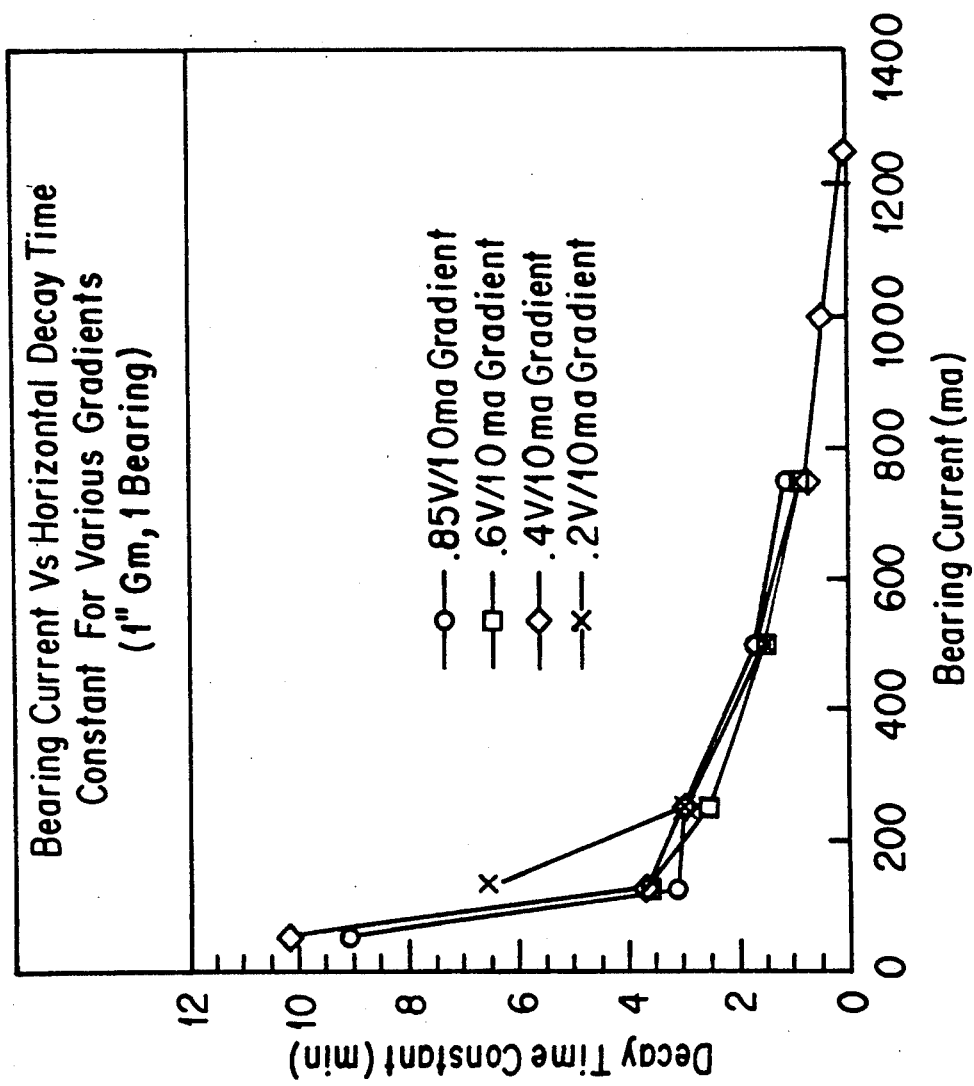
FIG. 32 is a plot of horizontal decay time constant versus bearing current for various vertical force gradients, representing results obtained with configuration (h)

Horizontal shocks, produced mechanically, exhibited the opposite behavior. While there is no dependence of the relaxation time on the vertical gradient of the levitating force, there is strong dependence on the bearing current; this is shown by the plot in FIG. 32 of horizontal (long) decay time constant of the gravity signal for a single bearing with vertical windings. As expected, larger bearing currents produce larger eddy currents, and hence faster damping. The symbols in FIG. 32 denote various vertical force gradients.

BEARING WITH SOLENOIDAL WINDINGS (FIGS. 30A–30B, CONFIGURATION (J))

The bearing bobbin design is shown in FIG. 18(b). It was machined from high conductivity OFE-HIT copper. The bearing coil had two layers of 0.125 mm niobium wire, 156 turns/layer. A persistent mode switch was used to stabilize the current. The bearing sleeve was the same as that used for the bearing with vertical windings.

When operating this bearing it was found that there was an interaction between the bearing current and the levitation force on the sphere. Increasing bearing current tended to push the sphere and sleeve downwards. This is believed to be because of the interaction between magnetic field exiting the upper end of the solenoidal windings and the transition section of the sleeve. Were the sleeve to be uniform, there should be no coupling between bearing current and levitation force.

Figure 33:
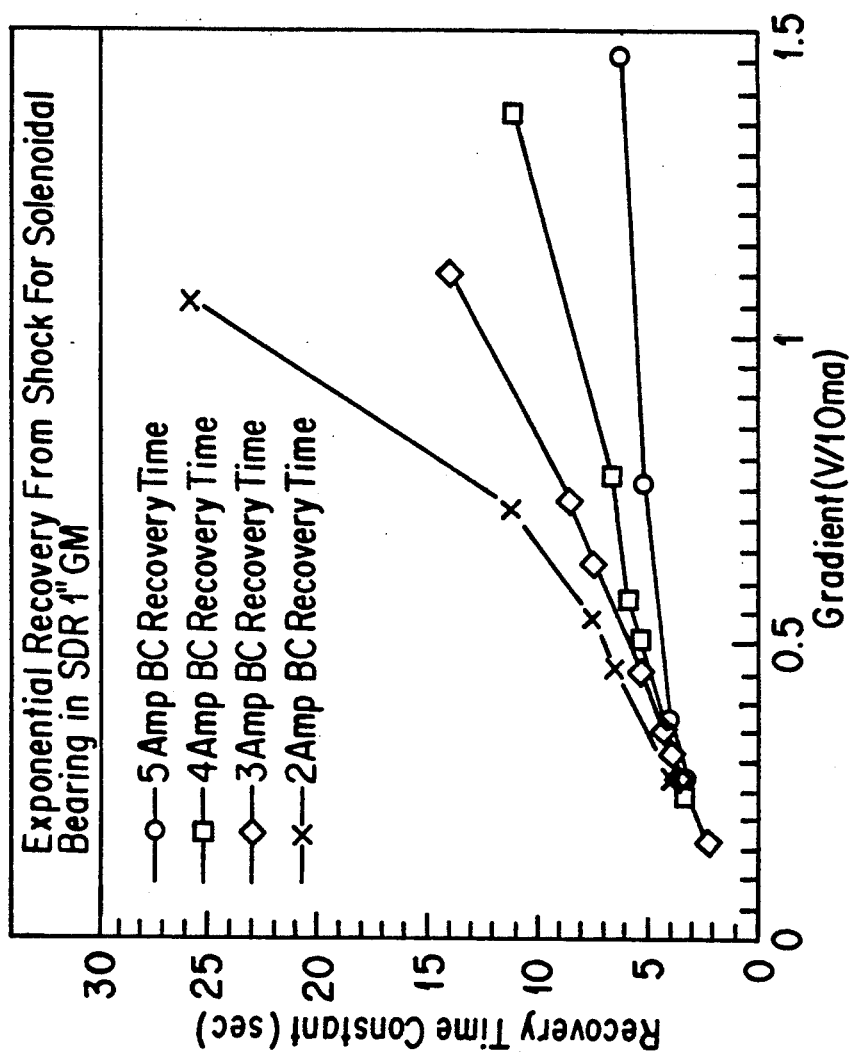
FIG. 33 is a plot of decay time constant of the gravity signal versus vertical force gradient for various bearing currents, representing results obtained with configuration (j)

A mode could be excited when the bearing current was less than 2 amps. However, for bearing currents greater than 2 amps, the mode was not excited. Moreover, the slow exponentially decaying recovery that was observed in experiments with configuration (h) were not observed with configuration (j). It appears that only vertical recoveries are observed despite the fact that both horizontal and vertical shocks were applied. The results for a variety of bearing currents and vertical force gradients are shown in the plot of FIG. 33. The decay time after vertical excitation does depend on bearing current in this case. Since there is known to be an interaction between vertical motion and the field inside the bearing sleeve, this is to be expected. For a bearing current of 5 amps, the recovery time constant was never greater than 6 seconds. Values along the horizontal axis in FIG. 33 are inversely proportional to the stiffness of the vertical force constant. A larger gradient corresponds to a weaker spring constant. The symbols in FIG. 33 denote various bearing currents.

The rectangular bearing of configuration (h) is characterized by a centralizing force which is strongest near the center of the coil. Therefore it is possible that a horizontal force causes the sphere and bearing sleeve to pivot about that center of force. On the other hand, the centering force of the solenoidal bearing of configuration (j) is localized at the two ends of the solenoid, which may suppress the extra degree of freedom displayed by the rectangular bearing. This may explain why the solenoidal bearing of configuration (j) eliminates the slow decay exhibited by configuration (h) after horizontal shocks.

Alternate Bearing Sleeve and Bearing Coil Supports

Figure 34:
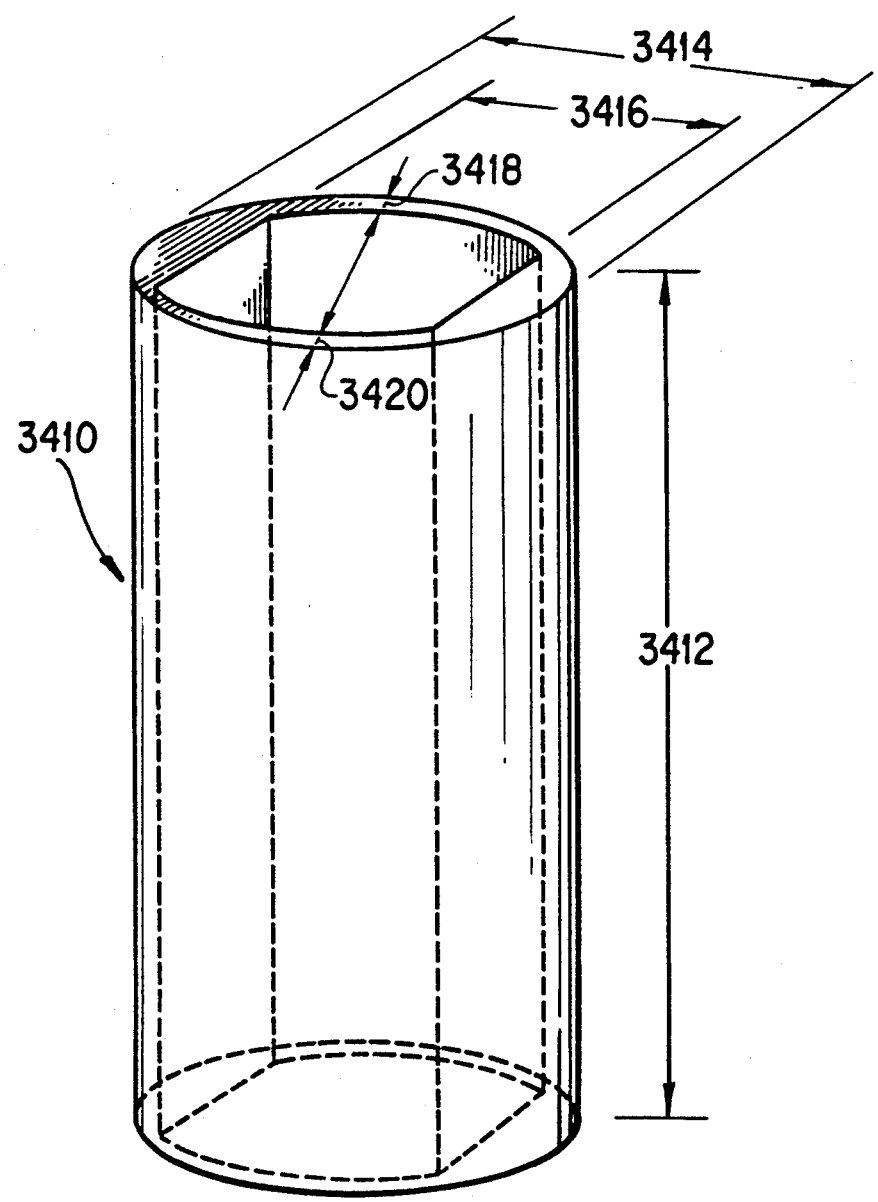
FIG. 34 is a perspective view of an alternate bearing sleeve in accordance with the invention.

FIG. 34 shows an alternate preferred bearing sleeve 3410 in accordance with the invention. Intended for use in a gravimeter having a ⅛"-diameter superconducting sphere, sleeve 3410 is machined of niobium to a length 3412 of 0.900" and having an outside diameter 3414 of 0.175". Two opposing planar interior faces are spaced apart a distance 3416 of 0.115". The wall thickness at 3418 and 3420 is 0.005". Taper along the length of the sleeve is not more than 0.001", and the interior of the sleeve is finished as smoothly as possible.

Figure 35:
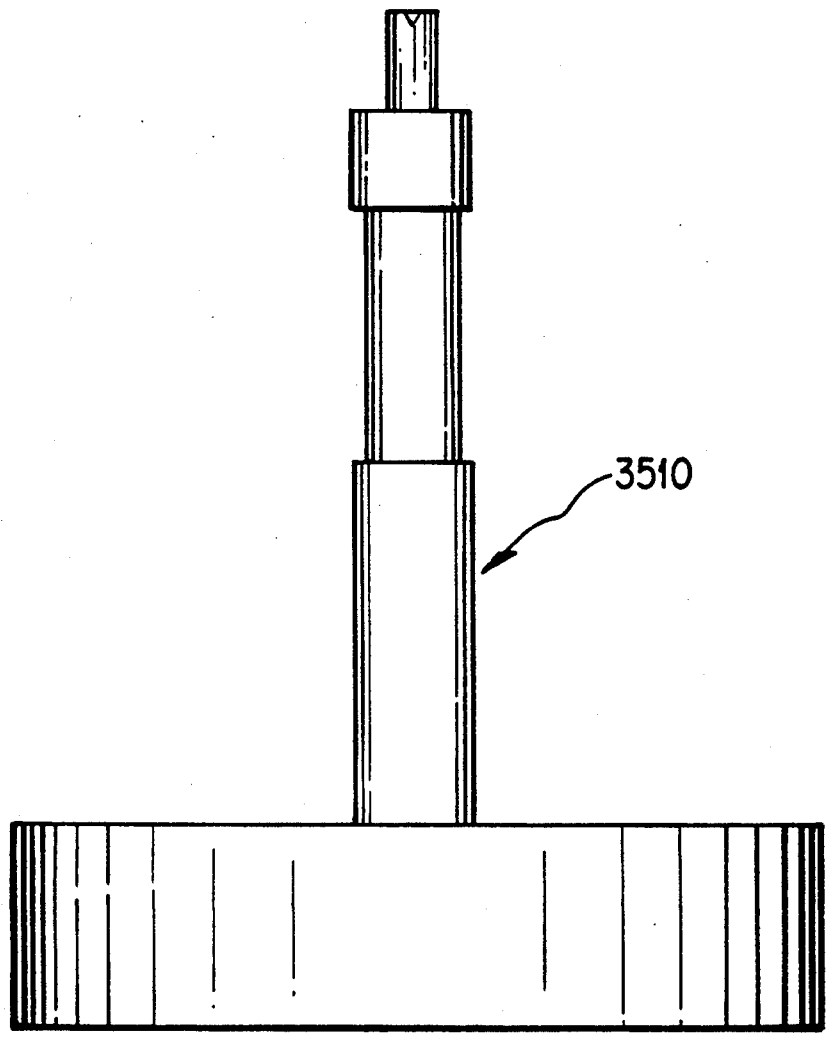
FIG. 35 is an elevation view.
Figure 36:
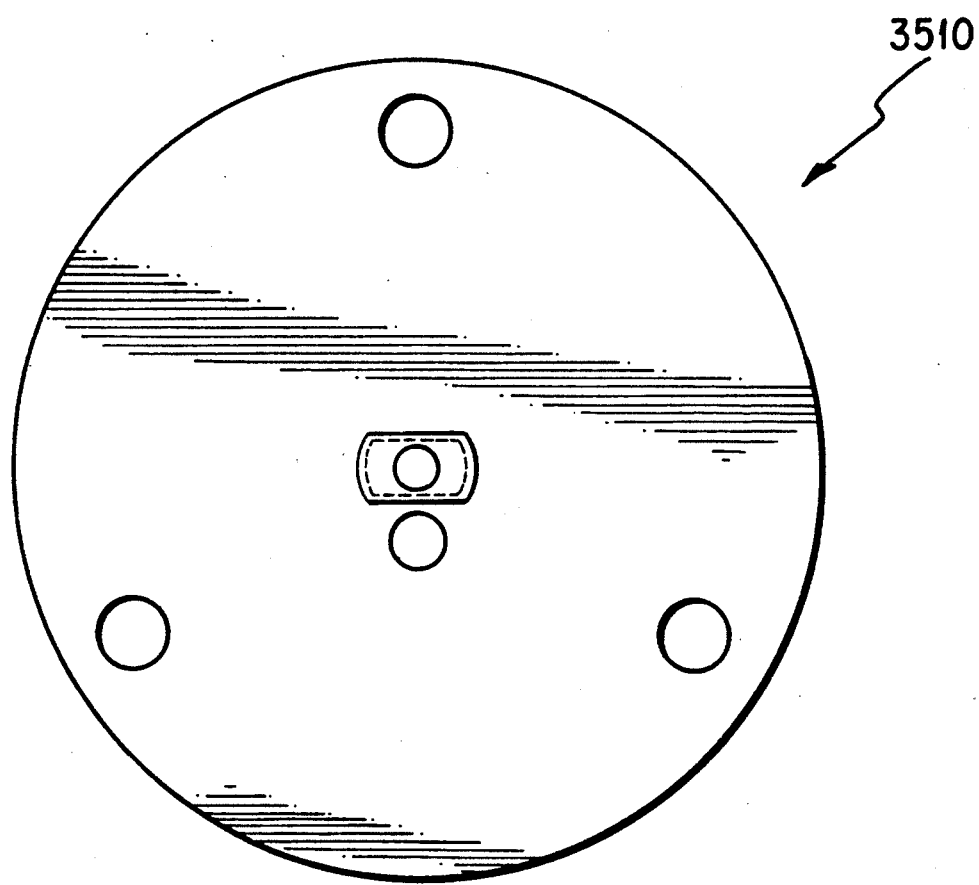
FIG. 36 is a top view, of an alternate bearing coil form in accordance with the invention.
Figure 37:
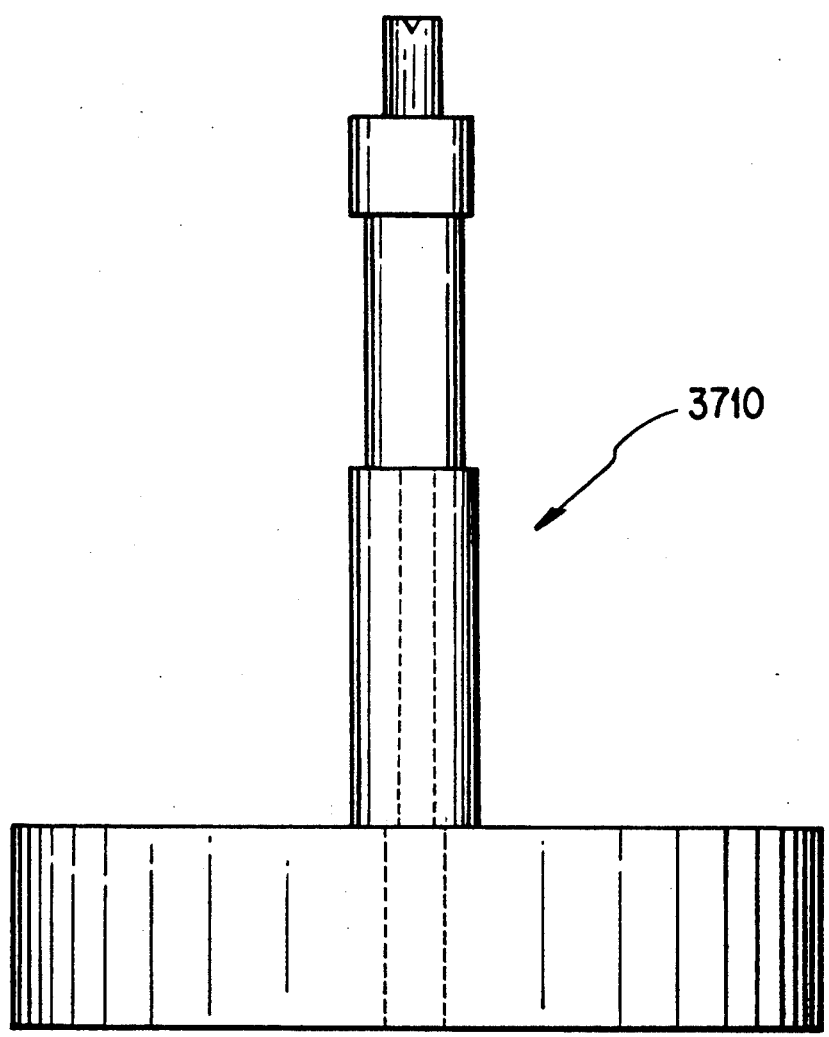
FIG. 37 is an elevation view.
Figure 38:
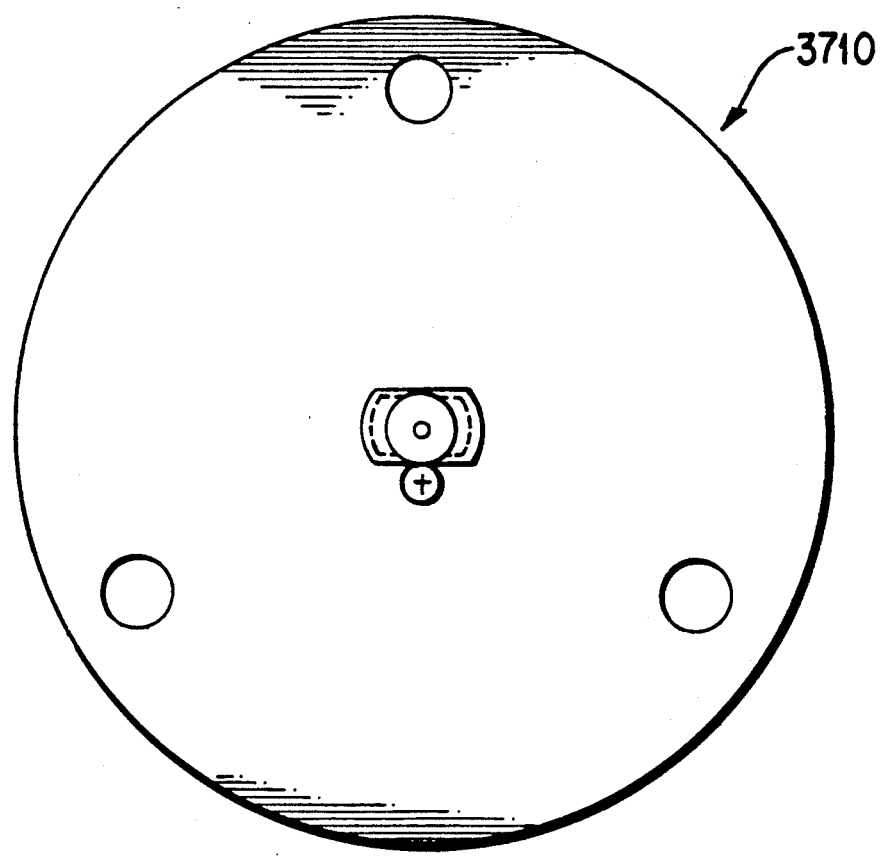
FIG. 38 is a top view, of a further bearing coil form in accordance with the invention.

A bearing coil support 3510 intended for use with the bearing sleeve of FIG. 34 is shown in elevation in FIG. 35 and in top view in FIG. 36. An alternate bearing coil support 3710 intended for use with the bearing sleeve of FIG. 34 is shown in elevation in FIG. 37 and in top view in FIG. 38. Supports 3510 and 3710 are preferably machined from highest-purity copper.

Still another bearing coil support 3910 intended for use with the bearing sleeve of FIG. 34 is shown in front elevation in FIG. 39, in right side elevation in FIG. 40, and in top view in FIG. 41. Support 3910 is preferably machined from OFE-HIT copper. A wire slot 3912 and an intersecting bore 3914 are provided for passage of connecting wires to coils (not shown in FIGS. 39–41) supported on opposing lugs 3916 and 3918. FIG. 42 shows a coiled bundle 4210 niobium wire to be mounted on one of lugs 3916 and 3918. These bearing coil supports are designed to be mounted on the bottom of a position sensing capacitor, though it will be recognized that other mountings are possible.

Conclusion

Superconducting bearings have been shown to be efficacious in eliminating resonant modes of the superconducting gravimeter. A variety of bearing configurations have been built and tested. The most desirable designs suppress the development of all modes and efficiently damp horizontal motions. The damping of vertical motions is controlled by the vertical force constant of the gravimeter. By using a superconducting bearing, and appropriately selecting the vertical force constant of the levitation system, the recovery time after an arbitrary shock can be reduced to a few seconds.

While the foregoing describes and illustrates particular preferred embodiments of the invention, it will be understood that many modifications may be made without departing from the spirit of the invention. We intend the following claims to cover any such modifications as fall within the true spirit and scope of the invention.

What is claimed is:

1. A bearing for a levitated body comprising superconductive material, comprising:
   a. an elongate member of superconductive material affixed to said levitated body and having a principal axis;
   b. coil means for generating a magnetic field which defines a bearing axis and which tends to bring said principal axis into coincidence with said bearing axis; and
   c. means for dissipating energy from changes in said magnetic field resulting from motion of said principal axis toward and away from coincidence with said bearing axis, said means for dissipating energy comprises at least one damping body of lossy conductive material located within said magnetic field such that motion of said principal axis toward and away from coincidence with said bearing axis will induce eddy currents in said damping body and thereby dampen said motion.

2. The bearing of claim 1, wherein said energy dissipating means comprises a body of high-purity metallic copper.

3. The bearing of claim 1, wherein said energy dissipating means comprises a body of metallic silver.

4. The bearing of claim 1, wherein said coil means comprises a superconductive material.

5. The bearing of claim 1, wherein said coil means comprises niobium.

6. The bearing of claim 1, wherein said magnetic field is azimuthally asymmetric about said bearing axis, and said elongate member has an azimuthally asymmetric cross-section about said principal axis along at least a portion of its length lying within said magnetic field, such that said energy dissipating means dissipates energy from changes in said magnetic field resulting from motion of said elongate member about said bearing axis.

7. The bearing of claim 1, wherein said bearing axis is generally vertical and said levitated body and affixed elongate member are gravitationally stable such that said principal axis is substantially aligned with said bearing axis in the presence of gravity and in the absence of said magnetic field.

8. The bearing of claim 1, wherein said damping body comprises a hollow coil support of generally cylindrical form, said coil means is supported on said coil support, and said elongate member has a free end contained within said hollow coil support such that said bearing offers no more than minimal resistance to movement of said elongate member and said levitated body along said bearing axis.

9. The bearing of claim 1, wherein said elongate member comprises a first plate of superconductive material lying in a first plane and a second plate of superconductive material lying in a second plane orthogonal to said first plane, said bearing axis lying in said first and second planes, and said coil means comprises a first pair of coils situated on opposing sides of said first plate and a second pair of coils situated on opposing sides of said second plate.

10. The bearing of claim 1, wherein said damping body comprises a coil support of generally cylindrical form, said coil means is supported on said coil support, and said elongate member has a hollow interior region for containing said coil means and said damping body, such that said bearing permits movement of said elongate member and said levitated body along said bearing axis.

11. The bearing of claim 10, wherein said elongate member comprises a sleeve affixed to said levitated body.

12. The bearing of claim 10, wherein said magnetic field is azimuthally asymmetric about said bearing axis, and said sleeve has an azimuthally asymmetrical cross-section about said principal axis along at least a portion of its length lying within said magnetic field, such that said energy dissipating means dissipates energy from changes in said magnetic field resulting from motion of said elongate member about said bearing axis.

13. The bearing of claim 10, wherein said levitated body comprises a generally spherical hollow shell, said elongate member comprises a hollow sleeve passing through a central axis of said shell and said hollow sleeve is affixed to said shell at each intersection of said sleeve with said shell.

14. The bearing of claim 13, wherein said magnetic field is azimuthally asymmetric about said bearing axis, and said elongate member has an azimuthally asymmetrical cross-section about said principal axis along at least a portion of its length lying within said magnetic field, such that said energy dissipating means dissipates energy from changes in said magnetic field resulting from motion of said elongate member about said bearing axis.

15. The apparatus of claim 1, wherein said coil means is mounted on said means for dissipating energy.

16. Apparatus for stabilizing a levitated superconductive body, comprising:
   a. a hollow region of said body defined by an inner superconductive surface of said body, said hollow region extending along a first axis;
   b. means for generating a magnetic field within said hollow region, said magnetic field defining a bearing axis and tending to bring said first axis into coincidence with said bearing axis; and
   c. means located within said magnetic field for dissipating energy from changes in said magnetic field resulting from motion of said principal axis toward and away from coincidence with said bearing axis.

17. The bearing of claim 16, wherein said magnetic field is azimuthally asymmetric about said bearing axis, and at least a portion of said hollow region has an azimuthally asymmetric cross-section about said principal axis, such that said energy dissipating means dissipates energy from changes in said magnetic field resulting from motion of said elongate member about said bearing axis.

18. Apparatus for measuring force, comprising:
   a. a mass to be levitated, the mass comprising superconductive material;
   b. means for maintaining the mass at a temperature at which the mass is superconductive;
   c. means for generating a first magnetic field to levitate the mass along a vertical axis;
   d. means for detecting vertical position of the mass within the first magnetic field; and
   e. a bearing, comprising:
      i. an elongate member of superconductive material affixed to the mass and having a longitudinal axis;
      ii. means for generating a second magnetic field which tends to bring said longitudinal axis into coincidence with said vertical axis;
      iii. means for dissipating energy from changes in the second magnetic field resulting from motion of said longitudinal axis toward and away from coincidence with said vertical axis, wherein said energy dissipating means comprises at least one damping body of lossy conductive material located within said second magnetic field such that motion of said principal axis toward and away from coincidence with said bearing will induce eddy current in said damping body and thereby dampen said motion.

19. The apparatus of claim 22, wherein said detecting means comprises means for providing a position signal dependent on the detected vertical position of said mass, the apparatus further comprising means responsive to the position signal for generating a positioning field to counteract any vertical displacement of the mass.

20. The apparatus of claim 19, wherein said means for generating a positioning field comprises a coil supplied with current to produce a magnetic positioning field having a field strength dependent on said position signal.

21. The apparatus of claim 19, wherein said means for generating a positioning field comprises a set of electrically-charged plates for producing an electrostatic positioning field dependent on said position signal.

22. The bearing of claim 18, wherein said energy dissipating means comprises a body of high-purity metallic copper.

23. The bearing of claim 18, wherein said energy dissipating means comprises a body of metallic silver.

24. The bearing of claim 18, wherein said coil means comprises a superconductive material.

25. The bearing of claim 18, wherein said coil means comprises niobium.

26. The bearing of claim 18, wherein the second magnetic field is azimuthally asymmetric about said vertical axis, and said elongate member has an azimuthally asymmetric cross-section about said longitudinal axis along at least a portion of its length lying within the second magnetic field, such that said energy dissipating means dissipates energy from changes in the second magnetic field resulting from motion of the leviated mass about said vertical axis.

27. The bearing of claim 18, wherein said mass and affixed elongate member are gravitationally stable such that said longitudinal axis is substantially vertical in the presence of gravity and in the absence of said second magnetic field.

28. The bearing of claim 18, wherein said damping body comprises a coil support of generally cylindrical form, said coil means is supported on said coil support, and said elongate member has a hollow interior region for containing said coil means and said damping body, such that said bearing permits movement of said elongate member and said mass body along said vertical axis.

29. The bearing of claim 28, wherein said elongate member comprises a sleeve affixed to said levitated body.

30. The bearing of claim 28, wherein the second magnetic field is azimuthally asymmetric about said vertical axis, and said sleeve has an azimuthally asymmetrical cross-section about said longitudinal axis along at least a portion of its length lying within said second magnetic field, such that said energy dissipating means dissipates energy from changes in said magnetic field resulting from motion of said elongate member about said bearing axis.

31. The bearing of claim 28, wherein said levitated mass comprises a generally spherical hollow shell, said elongate member comprises a hollow sleeve passing through a central axis of said shell, and said hollow sleeve is affixed to said shell at each intersection of said sleeve with said shell.

32. The bearing of claim 31, wherein said second magnetic field is azimuthally asymmetric about said vertical axis, and said elongate member has an azimuthally asymmetrical cross-section about said longitudinal axis along at least a portion of its length lying within said second magnetic field, such that said energy dissipating means dissipates energy from changes in said magnetic field resulting from motion of said elongate member about said vertical axis.

33. Apparatus for measuring force, comprising:
 a. a body to be levitated, the body comprising superconductive material;
 b. means for maintaining the body at a temperature at which the body is superconductive;
 c. means for generating a first magnetic field to levitate the body along a vertical axis;
 d. means for detecting vertical position of the body within the first magnetic field; and
 e. a bearing comprising;
  i. a hollow region of said body defined by an inner superconductive surface of said body, said hollow region extending along a principal axis;
  ii. means for generating a second magnetic field within said hollow region, said second magnetic field defining a bearing axis and tending to bring said principal axis into coincidence with said bearing axis; and
  iii. means located within said second magnetic field for dissipating energy from changes in the second magnetic field resulting from motion of said principal axis toward and away from coincidence with said bearing axis.

34. The apparatus of claim 33, wherein said detecting means comprises means for providing a signal dependent on the detected vertical position of the body, the apparatus further comprising means responsive to the position signal for generating a positioning field to counteract any vertical displacement of the body.

35. The apparatus of claim 34, wherein said means for generating a positioning field comprises a coil supplied with current to produce a magnetic positioning field having a field strength dependent on said position signal.

36. The apparatus of claim 34, wherein said means for generating a positioning field comprises a set of electrically-charged plates for producing an electrostatic positioning field dependent on said position signal.

* * * * *